(12) United States Patent
Schlarb et al.

(10) Patent No.: US 9,137,480 B2
(45) Date of Patent: Sep. 15, 2015

(54) SECURE ESCROW AND RECOVERY OF MEDIA DEVICE CONTENT KEYS

(75) Inventors: John M. Schlarb, Duluth, GA (US); Kinney C. Bacon, Lawrenceville, GA (US)

(73) Assignee: Cisco Technology, Inc., San Jose, CA (US)

( * ) Notice: Subject to any disclaimer, the term of this patent is extended or adjusted under 35 U.S.C. 154(b) by 1103 days.

(21) Appl. No.: 11/428,367

(22) Filed: Jun. 30, 2006

(65) Prior Publication Data

US 2008/0005030 A1    Jan. 3, 2008

(51) Int. Cl.
| | |
|---|---|
| G06F 21/00 | (2013.01) |
| H04N 5/76 | (2006.01) |
| G06F 21/31 | (2013.01) |
| G06F 21/10 | (2013.01) |
| G06F 21/60 | (2013.01) |
| H04L 9/08 | (2006.01) |
| H04N 5/913 | (2006.01) |
| H04N 21/254 | (2011.01) |
| H04N 21/266 | (2011.01) |
| H04N 21/835 | (2011.01) |

(52) U.S. Cl.
CPC .................. *H04N 5/76* (2013.01); *G06F 21/10* (2013.01); *G06F 21/31* (2013.01); *G06F 21/602* (2013.01); *H04L 9/0894* (2013.01); *H04N 5/913* (2013.01); *H04N 21/2541* (2013.01); *H04N 21/26613* (2013.01); *H04N 21/835* (2013.01); *H04L 2209/60* (2013.01); *H04N 2005/91364* (2013.01)

(58) Field of Classification Search
CPC ....... H04L 9/08; H04L 2209/38; H04L 9/006; H04L 9/3294; H04L 9/3297; G06F 21/10; G06F 21/31; G06F 2211/007; G06Q 30/06

USPC ..................... 705/50, 67, 71, 51, 59; 380/255
See application file for complete search history.

(56) References Cited

U.S. PATENT DOCUMENTS

| | | | | |
|---|---|---|---|---|
| 4,633,391 | A | * 12/1986 | Rundell | ......................... 707/700 |
| 5,224,161 | A |   6/1993 | Daniel et al. | |
| 5,299,263 | A | *  3/1994 | Beller et al. | ..................... 380/30 |

(Continued)

FOREIGN PATENT DOCUMENTS

| | | |
|---|---|---|
| EP | 0 782 296 | 7/1997 |
| EP | 1 014 715 | 6/2000 |

(Continued)

OTHER PUBLICATIONS

"Explorer 8300 Series Digital Recorder" ScientificAtlanta.com [online] Oct. 2005, XP002459851, Retrieved from the Internet: URL:http://www.cisco.com/application/pdf/en/us/guest/products/ps8613/c1650/cdccont_0900aecd806c6913.pdf [retrieved on Nov. 22, 2007].

(Continued)

*Primary Examiner* — Mamon Obeid
(74) *Attorney, Agent, or Firm* — Merchant & Gould P.C.

(57) ABSTRACT

An embodiment of a method for secure escrow and recovery of media device content keys includes generating, with a first processor of a media device, an escrow key for encrypting a plurality of content keys, the content keys for encrypting instances of media content. The first processor of the media device encrypts the escrow key with a public key of a key clearinghouse. The escrow key, encrypted with the public key of the key clearinghouse, is stored in a storage location outside of the first processor of the media device.

17 Claims, 10 Drawing Sheets

(56) References Cited

U.S. PATENT DOCUMENTS

| | | | |
|---|---|---|---|
| 5,349,641 A | 9/1994 | Coutrot et al. | |
| 5,422,953 A * | 6/1995 | Fischer | 713/172 |
| 5,457,746 A * | 10/1995 | Dolphin | 705/51 |
| 5,721,777 A * | 2/1998 | Blaze | 380/286 |
| 5,742,677 A | 4/1998 | Pinder et al. | |
| 5,742,686 A | 4/1998 | Finley | |
| 5,796,829 A | 8/1998 | Newby et al. | |
| 5,856,975 A | 1/1999 | Rostoker et al. | |
| 5,870,474 A | 2/1999 | Wasilewski | |
| 5,872,846 A | 2/1999 | Ichikawa | |
| 5,905,522 A | 5/1999 | Lawler | |
| 5,915,068 A | 6/1999 | Levine | |
| 5,917,822 A | 6/1999 | Lyles et al. | |
| 5,933,503 A * | 8/1999 | Schell et al. | 713/189 |
| 5,940,391 A | 8/1999 | Malkin et al. | |
| 5,943,047 A | 8/1999 | Suzuki | |
| 5,961,603 A | 10/1999 | Kunkel et al. | |
| 5,987,572 A | 11/1999 | Weidner et al. | |
| 5,990,881 A | 11/1999 | Inoue et al. | |
| 5,990,927 A | 11/1999 | Hendricks et al. | |
| 5,999,970 A | 12/1999 | Krisbergh et al. | |
| 6,005,938 A | 12/1999 | Banker et al. | |
| 6,006,257 A | 12/1999 | Slezak | |
| 6,012,068 A | 1/2000 | Boezeman et al. | |
| 6,020,982 A | 2/2000 | Yamauchi et al. | |
| 6,035,281 A | 3/2000 | Crosskey et al. | |
| 6,057,872 A | 5/2000 | Candelore | |
| 6,058,383 A * | 5/2000 | Narasimhalu et al. | 705/44 |
| 6,088,455 A | 7/2000 | Logan et al. | |
| 6,098,056 A * | 8/2000 | Rusnak et al. | 705/75 |
| 6,105,134 A | 8/2000 | Pinder | |
| 6,108,002 A | 8/2000 | Ishizaki | |
| 6,118,976 A | 9/2000 | Arias et al. | |
| 6,148,082 A | 11/2000 | Slattery et al. | |
| 6,154,817 A | 11/2000 | Mohan et al. | |
| 6,157,377 A | 12/2000 | Shah-Nazaroff et al. | |
| 6,157,719 A | 12/2000 | Wasilewski et al. | |
| 6,173,400 B1 | 1/2001 | Perlman et al. | |
| 6,185,625 B1 | 2/2001 | Tso et al. | |
| 6,209,090 B1 * | 3/2001 | Aisenberg et al. | 713/178 |
| 6,216,231 B1 * | 4/2001 | Stubblebine | 726/10 |
| 6,229,895 B1 | 5/2001 | Son et al. | |
| 6,230,269 B1 | 5/2001 | Spies et al. | |
| 6,237,786 B1 * | 5/2001 | Ginter et al. | 213/153 |
| 6,246,767 B1 | 6/2001 | Akins, III et al. | |
| 6,252,964 B1 | 6/2001 | Wasilewski | |
| 6,253,375 B1 | 6/2001 | Gordon et al. | |
| 6,272,538 B1 * | 8/2001 | Holden et al. | 709/223 |
| 6,292,568 B1 | 9/2001 | Akins, III et al. | |
| 6,305,020 B1 | 10/2001 | Hoarty et al. | |
| 6,324,548 B1 * | 11/2001 | Sorenson | 707/648 |
| 6,345,307 B1 | 2/2002 | Booth | |
| 6,356,971 B1 | 3/2002 | Katz et al. | |
| 6,366,987 B1 | 4/2002 | Tzelnic et al. | |
| 6,378,130 B1 | 4/2002 | Adams | |
| 6,401,243 B1 | 6/2002 | Suzuki | |
| 6,424,714 B1 | 7/2002 | Wasilewski | |
| 6,424,717 B1 | 7/2002 | Pinder | |
| 6,459,427 B1 | 10/2002 | Mao et al. | |
| 6,484,182 B1 * | 11/2002 | Dunphy et al. | 700/231 |
| 6,484,318 B1 | 11/2002 | Shioda et al. | |
| 6,510,519 B2 | 1/2003 | Wasilewski | |
| 6,516,412 B2 | 2/2003 | Wasilewski | |
| 6,526,508 B2 | 2/2003 | Akins | |
| 6,532,593 B1 | 3/2003 | Moroney | |
| 6,543,053 B1 | 4/2003 | Li et al. | |
| 6,549,577 B2 | 4/2003 | Florencio et al. | |
| 6,560,340 B1 | 5/2003 | Akins | |
| 6,574,609 B1 * | 6/2003 | Downs et al. | 705/50 |
| 6,636,953 B2 | 10/2003 | Yuasa et al. | |
| 6,694,025 B1 * | 2/2004 | Epstein et al. | 380/279 |
| 6,727,944 B1 | 4/2004 | Adachi | |
| 6,744,892 B2 | 6/2004 | Akins | |
| 6,748,080 B2 | 6/2004 | Russ et al. | |
| 6,802,077 B1 * | 10/2004 | Schlarb | 725/104 |
| 6,804,357 B1 | 10/2004 | Ikonen et al. | |
| 6,937,729 B2 | 8/2005 | Akins | |
| 6,961,858 B2 * | 11/2005 | Fransdonk | 726/29 |
| 6,963,972 B1 | 11/2005 | Chang et al. | |
| 6,970,564 B1 | 11/2005 | Kubota et al. | |
| 6,971,008 B2 | 11/2005 | Wasilewski | |
| 7,020,635 B2 * | 3/2006 | Hamilton et al. | 705/51 |
| 7,062,658 B1 | 6/2006 | Cheriton et al. | |
| 7,065,216 B1 | 6/2006 | Benaloh et al. | |
| 7,080,049 B2 * | 7/2006 | Truitt et al. | 705/75 |
| 7,089,579 B1 | 8/2006 | Mao et al. | |
| 7,090,128 B2 * | 8/2006 | Farley et al. | 235/384 |
| 7,107,416 B2 | 9/2006 | Stuart et al. | |
| 7,107,462 B2 * | 9/2006 | Fransdonk | 713/193 |
| 7,124,303 B2 | 10/2006 | Candelore et al. | |
| 7,127,619 B2 | 10/2006 | Unger et al. | |
| 7,146,388 B2 | 12/2006 | Stakutis et al. | |
| 7,150,045 B2 * | 12/2006 | Koelle et al. | 726/26 |
| 7,151,831 B2 | 12/2006 | Candelore et al. | |
| 7,155,609 B2 | 12/2006 | Chan et al. | |
| 7,181,010 B2 | 2/2007 | Russ et al. | |
| 7,197,638 B1 * | 3/2007 | Grawrock et al. | 713/165 |
| 7,200,868 B2 | 4/2007 | Mattox et al. | |
| 7,212,725 B2 | 5/2007 | Gunji et al. | |
| 7,233,959 B2 | 6/2007 | Kanellos et al. | |
| 7,287,168 B2 | 10/2007 | Candelore et al. | |
| 7,363,326 B2 | 4/2008 | Margolus | |
| 7,505,592 B2 | 3/2009 | Russ et al. | |
| 7,515,712 B2 | 4/2009 | Wasilewski et al. | |
| 7,519,999 B2 | 4/2009 | Sedacca | |
| 7,587,502 B2 * | 9/2009 | Crawford et al. | 709/229 |
| 7,602,913 B2 | 10/2009 | Wasilewski | |
| 7,602,914 B2 | 10/2009 | Wasilewski | |
| 7,630,499 B2 | 12/2009 | Wasilewski | |
| 7,636,846 B1 | 12/2009 | Eskicioglu | |
| 7,650,442 B2 | 1/2010 | Ashley et al. | |
| 7,711,586 B2 * | 5/2010 | Aggarwal et al. | 705/5 |
| 7,860,250 B2 | 12/2010 | Russ et al. | |
| 7,861,082 B2 | 12/2010 | Pinder et al. | |
| 7,949,133 B2 | 5/2011 | Pinder | |
| 7,953,715 B2 * | 5/2011 | Nishida | 707/703 |
| 7,971,261 B2 * | 6/2011 | Pestoni | 726/27 |
| 7,978,720 B2 | 7/2011 | Russ et al. | |
| 8,055,910 B2 * | 11/2011 | Kocher et al. | 713/193 |
| 8,108,680 B2 | 1/2012 | Murray | |
| 8,208,796 B2 | 6/2012 | Prus et al. | |
| 8,732,849 B2 * | 5/2014 | Ohbitsu | 726/27 |
| 8,856,951 B2 * | 10/2014 | Yuki | 726/27 |
| 2001/0006400 A1 | 7/2001 | Kubo et al. | |
| 2001/0049824 A1 | 12/2001 | Baker et al. | |
| 2002/0013772 A1 | 1/2002 | Peinado | |
| 2002/0018130 A1 | 2/2002 | Suemoto et al. | |
| 2002/0026582 A1 | 2/2002 | Futamura et al. | |
| 2002/0044658 A1 | 4/2002 | Wasilewski et al. | |
| 2002/0069172 A1 * | 6/2002 | Omshehe et al. | 705/51 |
| 2002/0078153 A1 * | 6/2002 | Chung et al. | 709/204 |
| 2002/0094084 A1 | 7/2002 | Wasilewski et al. | |
| 2002/0099663 A1 | 7/2002 | Yoshino et al. | |
| 2002/0101990 A1 | 8/2002 | Morino et al. | |
| 2002/0104097 A1 * | 8/2002 | Jerding et al. | 725/115 |
| 2002/0108122 A1 | 8/2002 | Alao et al. | |
| 2002/0116708 A1 | 8/2002 | Morris et al. | |
| 2002/0144067 A1 | 10/2002 | Jeong | |
| 2002/0146237 A1 | 10/2002 | Safadi | |
| 2002/0184457 A1 | 12/2002 | Yuasa et al. | |
| 2002/0196939 A1 | 12/2002 | Unger et al. | |
| 2002/0199190 A1 | 12/2002 | Su | |
| 2003/0005446 A1 | 1/2003 | Jaff et al. | |
| 2003/0005454 A1 | 1/2003 | Rodriguez et al. | |
| 2003/0009668 A1 | 1/2003 | Chan et al. | |
| 2003/0021412 A1 | 1/2003 | Candelore et al. | |
| 2003/0026423 A1 | 2/2003 | Unger et al. | |
| 2003/0028890 A1 | 2/2003 | Swart | |
| 2003/0035543 A1 | 2/2003 | Gillon et al. | |
| 2003/0046686 A1 | 3/2003 | Candelore et al. | |
| 2003/0081776 A1 | 5/2003 | Candelore et al. | |
| 2003/0093680 A1 | 5/2003 | Astley et al. | |
| 2003/0110234 A1 | 6/2003 | Egli et al. | |
| 2003/0145329 A1 | 7/2003 | Candelore et al. | |

(56) References Cited

U.S. PATENT DOCUMENTS

| | | | |
|---|---|---|---|
| 2003/0159140 A1 | 8/2003 | Candelore et al. | |
| 2003/0161473 A1* | 8/2003 | Fransdonk | 380/277 |
| 2003/0161617 A1 | 8/2003 | Um et al. | |
| 2003/0174837 A1 | 9/2003 | Candelore et al. | |
| 2003/0174844 A1 | 9/2003 | Candelore | |
| 2003/0182579 A1 | 9/2003 | Leporini et al. | |
| 2003/0188164 A1 | 10/2003 | Okimoto et al. | |
| 2003/0200337 A1 | 10/2003 | Jabri et al. | |
| 2003/0233558 A1 | 12/2003 | Lieberman | |
| 2004/0022307 A1 | 2/2004 | Dale et al. | |
| 2004/0039911 A1 | 2/2004 | Oka et al. | |
| 2004/0045030 A1 | 3/2004 | Reynolds et al. | |
| 2004/0052377 A1 | 3/2004 | Mattox et al. | |
| 2004/0068739 A1 | 4/2004 | Russ et al. | |
| 2004/0073917 A1 | 4/2004 | Pedlow et al. | |
| 2004/0088328 A1 | 5/2004 | Cook et al. | |
| 2004/0098591 A1 | 5/2004 | Fahrny | |
| 2004/0098603 A1 | 5/2004 | Corinne | |
| 2004/0117831 A1 | 6/2004 | Ellis et al. | |
| 2004/0123094 A1 | 6/2004 | Sprunk | |
| 2004/0123313 A1 | 6/2004 | Koo et al. | |
| 2004/0128499 A1 | 7/2004 | Peterka et al. | |
| 2004/0187014 A1 | 9/2004 | Molaro | |
| 2004/0193921 A1 | 9/2004 | Byrne | |
| 2004/0228175 A1 | 11/2004 | Candelore et al. | |
| 2004/0236804 A1 | 11/2004 | Bots et al. | |
| 2004/0237100 A1 | 11/2004 | Pinder | |
| 2005/0076066 A1 | 4/2005 | Stakutis et al. | |
| 2005/0080497 A1 | 4/2005 | Rao | |
| 2005/0091173 A1 | 4/2005 | Alve | |
| 2005/0100162 A1 | 5/2005 | Alve et al. | |
| 2005/0102513 A1 | 5/2005 | Alve | |
| 2005/0102702 A1 | 5/2005 | Candelore et al. | |
| 2005/0105732 A1 | 5/2005 | Hutchings et al. | |
| 2005/0111835 A1 | 5/2005 | Friel et al. | |
| 2005/0125357 A1 | 6/2005 | Saadat et al. | |
| 2005/0169467 A1 | 8/2005 | Risan et al. | |
| 2005/0169473 A1 | 8/2005 | Candelore et al. | |
| 2005/0180568 A1 | 8/2005 | Krause | |
| 2005/0192904 A1 | 9/2005 | Candelore et al. | |
| 2005/0201559 A1 | 9/2005 | Van Der Heijden | |
| 2005/0213147 A1* | 9/2005 | Minatogawa | 358/1.15 |
| 2005/0223414 A1 | 10/2005 | Kenrich et al. | |
| 2005/0232593 A1 | 10/2005 | Kanai | |
| 2005/0237396 A1 | 10/2005 | Hagiwara et al. | |
| 2005/0240708 A1 | 10/2005 | Shaver et al. | |
| 2005/0240974 A1 | 10/2005 | Hiramoto et al. | |
| 2006/0013566 A1 | 1/2006 | Nakamura | |
| 2006/0020786 A1 | 1/2006 | Helms et al. | |
| 2006/0039256 A1 | 2/2006 | Nakamura et al. | |
| 2006/0039559 A1 | 2/2006 | Wasilewski | |
| 2006/0039560 A1 | 2/2006 | Wasilewski | |
| 2006/0041905 A1* | 2/2006 | Wasilewski | 725/31 |
| 2006/0072752 A1 | 4/2006 | Nakano et al. | |
| 2006/0074807 A1 | 4/2006 | Gauba et al. | |
| 2006/0093325 A1 | 5/2006 | Imai et al. | |
| 2006/0109854 A1 | 5/2006 | Cancel | |
| 2006/0115083 A1 | 6/2006 | Candelore et al. | |
| 2006/0153379 A1 | 7/2006 | Candelore et al. | |
| 2006/0156382 A1 | 7/2006 | Motoyama | |
| 2006/0179478 A1* | 8/2006 | Han et al. | 726/5 |
| 2006/0184733 A1 | 8/2006 | Yamamoto et al. | |
| 2006/0187951 A1 | 8/2006 | Ginzburg et al. | |
| 2006/0190408 A1* | 8/2006 | Cook et al. | 705/59 |
| 2006/0200865 A1 | 9/2006 | Leake et al. | |
| 2006/0262926 A1 | 11/2006 | Candelore et al. | |
| 2006/0269060 A1 | 11/2006 | Candelore et al. | |
| 2006/0294017 A1* | 12/2006 | Kim et al. | 705/59 |
| 2007/0055390 A1 | 3/2007 | Simon et al. | |
| 2007/0099694 A1 | 5/2007 | McCarthy et al. | |
| 2007/0130254 A1 | 6/2007 | Russ et al. | |
| 2007/0150960 A1 | 6/2007 | Dubroeucq et al. | |
| 2007/0189525 A1 | 8/2007 | Wajs | |
| 2007/0192586 A1 | 8/2007 | McNeely | |
| 2007/0204146 A1 | 8/2007 | Pedlow et al. | |
| 2007/0219917 A1* | 9/2007 | Liu et al. | 705/59 |
| 2007/0239608 A1* | 10/2007 | Elbring | 705/51 |
| 2007/0245148 A1* | 10/2007 | Buer | 713/182 |
| 2007/0277205 A1 | 11/2007 | Grannan | |
| 2007/0291940 A1 | 12/2007 | Candelore et al. | |
| 2007/0294170 A1 | 12/2007 | Vantalon et al. | |
| 2007/0294178 A1 | 12/2007 | Pinder et al. | |
| 2008/0137852 A1 | 6/2008 | Mamidwar | |
| 2008/0170687 A1 | 7/2008 | Moors et al. | |
| 2008/0177998 A1 | 7/2008 | Apsangi et al. | |
| 2009/0028327 A1 | 1/2009 | Pinder | |
| 2009/0031409 A1 | 1/2009 | Murray | |
| 2009/0048978 A1* | 2/2009 | Ginter et al. | 705/51 |
| 2009/0080648 A1 | 3/2009 | Pinder | |
| 2009/0089369 A1 | 4/2009 | Russ et al. | |
| 2013/0332976 A1* | 12/2013 | Shenker et al. | 725/114 |

FOREIGN PATENT DOCUMENTS

| | | |
|---|---|---|
| EP | 1 161 087 A2 | 12/2001 |
| EP | 1 213 919 | 12/2002 |
| EP | 1 447 983 A1 | 8/2004 |
| EP | 1 760 619 | 3/2007 |
| FR | 2 779 599 | 12/1999 |
| GB | 2 403 586 A | 1/2005 |
| KR | 10-2003-0037098 | 5/2003 |
| KR | 10-2004-0062662 | 7/2004 |
| WO | WO 00/11840 | 3/2000 |
| WO | WO 00/50978 | 8/2000 |
| WO | WO 00/51041 | 8/2000 |
| WO | WO 01/18807 | 3/2001 |
| WO | WO 01/18807 A2 | 3/2001 |
| WO | WO 0118807 A2 * | 3/2001 |
| WO | WO 01/75876 | 10/2001 |
| WO | WO 01/82588 | 11/2001 |
| WO | WO 02/097997 | 12/2002 |
| WO | WO 2004/023262 A2 | 3/2004 |
| WO | WO 2004/098190 | 11/2004 |
| WO | WO 2005/029843 | 3/2005 |
| WO | WO 2005/029852 | 3/2005 |
| WO | WO 2005/091626 | 9/2005 |
| WO | WO 2005/101411 | 10/2005 |
| WO | WO 2006/038204 | 4/2006 |
| WO | WO 2006/066052 | 6/2006 |
| WO | WO 2008/005699 | 1/2008 |
| WO | WO 2008/005700 | 1/2008 |
| WO | WO 2009/015116 A1 | 1/2009 |
| WO | WO 2009/018006 | 2/2009 |
| WO | WO 2009/042532 | 4/2009 |

OTHER PUBLICATIONS

Gilo: "Do It Yourself Making an External Hard Drive Guide" Notebookreview.com, [online], Jun. 2, 2006, XP002459852, Retrieved from the Internet: URL:http://www.notebookreview.com/default.asp?newsID=2972 [retrieved on Nov. 22, 2007].

U.S. Appl. No. 10/873,805, filed Jun. 22, 2004, Entitled "Validating Client Receivers," Inventors: Pinder et al.

U.S. Appl. No. 10/920,926, filed Aug. 18, 2004, Entitled "Retrieval and Transfer of Encrypted Hard Drive Content from Digital Video Receiver Set Top Box," Inventor: Wasilewski, Anthony.

U.S. Appl. No. 10/920,841, filed Aug. 18, 2004, Entitled "Retrieval and Transfer of Encrypted Hard Drive Content from Digital Video Receiver Set Top Box Utilizing Second Digital Video Receiver Set Top Box," Inventor: Wasilewski, Anthony.

U.S. Appl. No. 10/920,842, filed Aug. 18, 2004, Entitled "Utilization of Encrypted Hard Drive Content by One Digital Video Receiver Set Top Box when Recorded by Another," Inventor: Wasilewski, Anthony.

U.S. Appl. No. 11/405,205, filed Apr. 17, 2006, Entitled "System and Method for Prioritizing the Storage Location of Media Data," Inventors: Prus et al.

U.S. Appl. No. 11/454,421, filed Jun. 16, 2006, Entitled "Securing Media Content Using Interchangeable Encryption Key," Inventors: Pinder et al.

U.S. Appl. No. 11/428,362, filed Jun. 30, 2006, Entitled "System and Method for Managing Media Data," Inventors: Prus et al.

(56) References Cited

OTHER PUBLICATIONS

U.S. Appl. No. 11/428,356, filed Jun. 30, 2006, Entitled "System and Method for Applying Retention Rules," Inventors: Prus et al.
U.S. Appl. No. 11/428,357, filed Jun. 30, 2006, Entitled "Digital Media Device having Selectable Media Content Storage Locations," Inventors: Prus et al.
U.S. Appl. No. 11/428,365, filed Jun. 30, 2006, Entitled "Digital Media Device having Media Content Transfer Capability," Inventors: Russ et al.
U.S. Appl. No. 11/671,506, filed Feb. 6, 2007, Entitled "Apparatus for Entitling and Transmitting Service Instances to Remote Client Devices," Inventors: Russ et al.
U.S. Appl. No. 11/942,778, filed Nov. 20, 2007, Entitled "Retrieval and Transfer of Encrypted Hard Drive Content from Digital Video Receiver Set Top Box to a Content Transcription Device," Inventor: Wasilewski, Anthony.
Canadian Office Action mailed Jun. 13, 2011 cited in Application No. 2,655,536.
Canadian Office Action mailed Jun. 13, 2011 cited in Application No. 2,655,526.
European Summons to Attend Oral Proceedings dated Aug. 1, 2012 cited in Appl. No. 07840308.6, 7 pgs.
Canadian Office Action dated Aug. 3, 2012 cited in Appl. No. 2,655,677, 3 pgs.
U.S. Office Action mailed Sep. 18, 2012 in U.S. Appl. No. 11/454,421, 40 pgs.
Canadian Office Action dated Aug. 24, 2011 cited in Application No. 2,655,114.
Canadian Office Action dated Aug. 29, 2011 cited in Application No. 2,655,530.
Canadian Office Action dated Sep. 2, 2011 cited in Application No. 2,652,745.
European Office Action dated Oct. 11, 2013 cited in Appl. No. 07 781 952.2, 4 pgs.
U.S. Final Office Action dated Apr. 16, 2013 cited in U.S. Appl. No. 11/454,421, 23 pgs.
Canadian Office Action dated Apr. 16, 2012 cited in Application No. 2,655,530, 3 pgs.
European Summons to Attend Oral Proceedings dated May 14, 2013 cited in Application No. 11169374.3, 8 pgs.
Canadian Office Action dated Nov. 1, 2012 cited in Application No. 2,694,201, 3 pgs.
European Office Action dated Nov. 14, 2012 cited in Application No. 08 782 173.2, 6 pgs.
European Decision to Refuse dated Oct. 7, 2013 cited in Appl. No. 11 169 374.3, 13 pgs.
Canadian Office Action dated Oct. 24, 2013 cited in Appl. No. 2,655,530, 6 pgs.
Allway Sync (Allway Sync 3.2.2), Dec. 6, 2005, pp. 1-14.
Barton "TiVO—Lution: The Challenges of delivery a reliable, easy-to-use DVR service to the masses" ACM QUEUE Apr. 2006 35 more queue: www.acmqueue.com.
Blackcurrant, ("Delete Files Across a Network"), May 11, 2005; accessed Jul. 2, 2010 at http://techrepublic.com.com/5208-6230-0.html?forumID=3&threadID=173478&start=0; 3 pgs.
Boston College, "Copying Files to a USB Drive or External Hard Drive," Nov. 8, 2005, pp. 1-5 http://web.archive.org/web/20060227003853/http://www.bc.edu/offices/help/met-elements/doc/articles/html/HW-usb-drive-copy.shtml.
Chorianopoulous et al. "Affective Usability Evaluation for an Interactive Music Television Channel" ACM Computers in Entertainment, vol. 2, No. 3, Jul. 2004, Article 7b.
Dybwad, B.; ("TiVo 7.2 OS Adds Red Flag Content Protection Feature"), Sep. 14, 2005, pp. 1-5, http://www.engadget.com/2005/09/14/tivo-7-2-os-adds-red-flag-content-protection-feature/.
Ellison, "TiVo Series 2", Jan. 13, 2004, pp. 1-6, http://www.pcmag.com/article2/8,2817,1649659,00.asp.
Eskicioglu et al. "An overview of multimedia content protection in consumer electronics devices," Signal Processing. Image Communication, Elsevier Science Publishers, Ambsterdam, NL, vol. 16, No. 7, Apr. 2001, pp. 681-699, XP004232133 ISSN: 0923-5965.
Haughey, M.; ("PC to TiVo Playback Released"), Oct. 24, 2005, pp. 1-13 http://web.archive.org/web/20051024002825/http://www.pvrblog.com/pvr/2005/08/pc_to_tivo_play.html.
Haughey, M.; ("TiVo 7.2 OS Adds Content Protection, Blocks Transfers, and Auto-Deletes Some Shows"), Sep. 13, 2005, pp. 1-14, http://www.pvrblog.com/pvr/2005/09/tivo_72_os_adds.html.
Menezes, et al.; "Handbook of Applied Cryptography" Handbook of applied Cryptography, CRC Press Series on Discrete Mathematics and Its Applications, Boca Raton, FL CRC Press, 1997, pp. 546, 567-570, XP002356116 ISBN: 0-8493-8523-7.
Old Apps, ("Old Version of WinSCP"), Jan. 13, 2003, pp. 1-3; accessed Jul. 2, 2010 at http://www.oldapps.com/WinSCP.php?old_winscp=2; 3 pgs.
Picker, "The Digital Video Recorder: Unbundling Advertising and Content" Professor of Commercial Law, The University of Chicago Law School, Senior Fellow, The Computation Institute of the University of Chicago and Argonne National Laboratory; Sep. 10, 2003.
Smith, J.; "Files and Folders: Removable Media," Oct. 13, 2004, pp. 1-12 http://web.archive.org/web/20041027194919/http://www.jegsworks.com/Lessons/win/filesandfolders/step-removabledisk.htm.
TiVo.com "What is TiVo?", Jan. 14, 2005, pp. 1-12; http://web.archive.org/web/20050114053806/http://www.tivo.com/1.0.asp.
WinFtp, Sep. 8, 2005, pp. 1-7 http://download.cnet.com/WinFtp-Client/3000-2160_4-10429297.html.
Wurmlin et al. "3D Video Record" Proceedings of the 10th Pacific Conference on Computer Graphics and Applications (PG'02) IEEE Computer Society.
International Search Report dated Oct. 22, 2003 in PCT/US2003/016585.
International Search Report and Written Opinion dated Jun. 7, 2006, cited in PCT/US2005/022069.
International Search Report and Written Opinion dated Dec. 21, 2007, cited in PCT/US2007/071842.
International Search Report cited in PCT/US2007/071843 mailed Dec. 27, 2007.
Supplemental European Search Report dated Jan. 24, 2008, in Application No. 03 755 496.01.
International Search Report dated Jan. 31, 2008, in PCT/US2007/070680.
International Search Report and Written Opinion dated Mar. 10, 2008, cited in PCT/US2007/071841.
European Office Action mailed Jul. 24, 2008 in Application No. 03 755 496.1.
International Preliminary Report mailed Jan. 6, 2009, in PCT/US2007/072328.
European Office Action mailed Feb. 10, 2009, in Application No. 07798909.3.
European Office Action mailed Feb. 11, 2009, in Application No. 07798908.5.
European Office Action mailed Feb. 18, 2009, in Application No. 07 798 909.3.
European Office Action mailed Mar. 16, 2009, in Application No. 07 781 952.2.
European Office Action mailed Apr. 29, 2009 in Application No. 07 784 510.5.
European Office Action mailed Apr. 29, 2009 in Application No. 07 798 908.5.
European Office Action mailed May 7, 2009 in Application No. 07 840 308.6.
European Office Action mailed May 11, 2009 in Application No. 05 766 482.3.
European Office Action mailed Jun. 9, 2009 in Application No. 07 815 092.7.
Australian Office Action mailed Aug. 4, 2009 in Application 2005258137.
Canadian Office Action mailed Aug. 19, 2009 in Application 2,571,533.
Notice of Preliminary Rejection dated May 28, 2010, cited in KR Appl. No. 10-2008-7031848, 7 pgs.

(56) References Cited

OTHER PUBLICATIONS

European Office Action mailed Sep. 9, 2010 in Application No. 07 840 308.6.
Notice of Preliminary Rejection dated Sep. 18, 2010 cited in Korean Application No. 10-2008-7032127.
Notice of Preliminary Rejection dated Oct. 25, 2010 cited in Korean Application No. 10-2008-7030549.
Notice of Final Rejection dated Nov. 26, 2010 cited in Korean Application No. 10-2008-7031848.
Office Action mailed Aug. 20, 2007, in U.S. Appl. No. 10/873,805.
Office Action mailed Jan. 9, 2008, in U.S. Appl. No. 10/873,805.
Office Action mailed Apr. 30, 2008, in U.S. Appl. No. 11/482,356.
Office Action mailed Jul. 9, 2008, in U.S. Appl. No. 10/873,805.
Office Action mailed Aug. 5, 2008, in U.S. Appl. No. 11/428,357.
Office Action mailed Sep. 30, 2008, in U.S. Appl. No. 11/428,362.
Office Action mailed Nov. 28, 2008, in U.S. Appl. No. 11/482,356.
Office Action mailed Dec. 12, 2008, in U.S. Appl. No. 11/428,365.
Office Action mailed Dec. 17, 2008, in U.S. Appl. No. 10/873,805.
Office Action mailed Mar. 18, 2009, in U.S. Appl. No. 11/428,362.
Office Action mailed Apr. 2, 2009, in U.S. Appl. No. 11/428,357.
Office Action mailed May 28, 2009, in U.S. Appl. No. 11/428,365.
Office Action mailed Jul. 22, 2009, in U.S. Appl. No. 11/428,357.
Office Action mailed Aug. 4, 2009, in U.S. Appl. No. 11/428,356.
Office Action mailed Aug. 7, 2009, in U.S. Appl. No. 11/428,362.
Office Action mailed Sep. 22, 2009, in U.S. Appl. No. 11/454,421.
Office Action mailed Oct. 7, 2009, in U.S. Appl. No. 11/428,367.
Office Action mailed Oct. 26, 2009, in U.S. Appl. No. 11/428,365.
Office Action mailed Oct. 28, 2009, in U.S. Appl. No. 11/942,778.
Office Action mailed Dec. 9, 2009, in U.S. Appl. No. 11/428,357.
Office Action mailed Jan. 14, 2010, in U.S. Appl. No. 11/428,362.
Office Action mailed Feb. 1, 2010, in U.S. Appl. No. 11/428,356.
Office Action mailed Feb. 24, 2010, in U.S. Appl. No. 12/327,157.
Office Action mailed Apr. 1, 2010, in U.S. Appl. No. 11/405,205.
Office Action mailed Apr. 13, 2010, in U.S. Appl. No. 11/454,421.
Office Action mailed May 5, 2010, in U.S. Appl. No. 11/428,365.
Office Action mailed May 11, 2010, in U.S. Appl. No. 11/428,357.
Office Action mailed May 26, 2010, in U.S. Appl. No. 11/428,362.
Office Action mailed Aug. 31, 2010 in U.S. Appl. No. 11/405,205.
Office Action mailed Oct. 14, 2010 in U.S. Appl. No. 11/428,365.
Office Action mailed Oct. 26, 2010 in U.S. Appl. No. 11/428,357.
Office Action mailed Nov. 2, 2010 in U.S. Appl. No. 11/428,362.
U.S. Official Action mailed Dec. 8, 2010 in U.S. Appl. No. 11/781,412.
U.S. Official Action mailed Feb. 2, 2011 in U.S. Appl. No. 11/829,647.
Canadian Office Action dated Sep. 21, 2011 cited in Application No. 2,655,677.
Canadian Office Action dated Sep. 21, 2011 cited in Application No. 2,655,531.
U.S. Office Action dated Oct. 19, 2011 cited in U.S. Appl. No. 11/405,205.
Canadian Office Action dated Jan. 22, 2013 cited in Appl. No. 2,655,530, 5 pgs.
Canadian Office Action dated Feb. 1, 2013 cited in Appl. No. 2,655,114, 9 pgs.
Chinese First Office Action dated Feb. 29, 2012 cited in Application No. 200880108773.4, 10 pgs.
Canadian Office Action dated May 3, 2012 cited in Application No. 2,655,531, 3 pgs.
Canadian Office Action dated May 10, 2012 cited in Application No. 2,655,536, 3 pgs.
Canadian Office Action dated May 10, 2012 cited in Application No. 2,655,526, 3 pgs.
Canadian Office Action dated Jul. 4, 2012 cited in Application No. 2,655,114, 3 pgs.
Canadian Office Action dated Jun. 14, 2013 cited in Application No. 2,655,526, 5 pgs.
European Decision to Refuse dated Jul. 26, 2011 cited in Application No. 07 815 092.7-1245.
Korean Notice of Final Rejection dated Jul. 28, 2011 cited in Application No. 10-2008-7030549.
European Office Communication dated Oct. 5, 2012 cited in Appl. No. 07 798 910.1, 7 pgs.
European Office Communication dated Oct. 16, 2012 cited in Appl. No. 11 169 374.3, 7 pgs.
International Search Report dated Jan. 31, 2008 in PCT/US2007/070680.
International Search Report and Written Opinion mailed Sep. 16, 2008 in PCT/US2008/070707.
International Search Report dated Dec. 12, 2008 in PCT/US2008/070690.
Written Opinion dated Dec. 12, 2008 in PCT/US2008/070690.
International Preliminary Report mailed Jan. 6, 2009 in PCT/US2007/072328.
International Search Report dated Apr. 28, 2009 in PCT/US2008/077157.
International Preliminary Report on Patentability dated Mar. 30, 2010 in PCT/US2008/077157.
EP Communication dated May 6, 2010 in Application No. 08 833 391.9-1244.
U.S. Official Action mailed Jun. 17, 2010 in U.S. Appl. No. 11/781,412.
U.S. Official Action mailed Aug. 16, 2010 in U.S. Appl. No. 11/829,647.
U.S. Official Action mailed Aug. 31, 2010 in U.S. Appl. No. 11/861,328.
U.S. Appl. No. 09/111,958, filed Jul. 8, 1998, entitled "Mechanism and Apparatus for Encapsulation of Entitlement Authorization in Conditional Access System," Inventor: Defreese et al.
Extended European Search Report dated Dec. 22, 2011 cited in Application No. 11169374.3, 9 pgs.
Canadian Office Action dated Jun. 14, 2013 cited in Application No. 2,655,536, 3 pgs.
Canadian Office Action dated Dec. 9, 2013 cited in Application No. 2,694,201, 2 pgs.
Canadian Office Action mailed Jan. 12, 2011 in Application No. 2,571,533.
Canadian Office Action mailed Feb. 2, 2011 in Application No. 2,652,745.
European Office Action dated Apr. 4, 2011 in Application No. 07 815 092.7.
European Office Action dated Apr. 21, 2011 in Application No. 07 798 909.3.
U.S. Official Action mailed Apr. 21, 2011 in U.S. Appl. No. 11/781,412.
European Summons to Attend Oral Proceedings dated Jun. 26, 2014 cited in Application No. 07798910.1, 6 pgs.
Canadian Office Action dated Jun. 27, 2014 cited in Application No. 2,655,530, 2 pgs.
Canadian Final Action dated Jan. 16, 2015 cited in Appl. No. 2,655,531, 7 pgs.
The Norton Commander running under the DOS and Windows operating systems officially produced between 1986 and 1998, 4 pgs. (http://en.wikipedia.org/wiki/Norton_Commander).
The Windows File Manager released between 1990 and 1999, 3 pgs. (http://en.wikipedia.org/wiki/File_Manager_(Windows)).
The iTunes application, 18 pgs. (http://en.wikipedia.org/wiki/iTunes_Store) introduced to the public on Apr. 28, 2003.
Canadian Office Action dated Nov. 26, 2014 cited in Appl. No. 2,655,526, 6 pgs.
iPod shuffle User's Guide (Apple Computer, Inc.) 2005 (http://manuals.info.apple.com/en_US/iPodshuffleUserGuide.pdf), 32 pgs.
European Office Action dated Jan. 18, 2012 cited in Appl. No. 07 781 952.2, 5 pgs.
Canadian Office Action dated Nov. 27, 2014 cited in Appl. No. 2,694,201, 3 pgs.
Canadian Office Action dated Jun. 10, 2013 cited in Application No. 2,655,531, 5 pgs.

* cited by examiner

SECURE ESCROW AND RECOVERY OF MEDIA DEVICE CONTENT KEYS

BACKGROUND

1. Technical Field

The present disclosure generally relates to securing data, and more particularly, to securing data associated with a digital media device.

2. Description of the Related Art

A storage device, such as a hard drive of a digital media recording device, can be used to store media data associated with received audio and/or video content. For example, one such digital media recording device is a digital video recorder (DVR). A DVR application executed by the DVR provides user interface screens that can be used to manage the media data stored to the storage device. The DVR application can also be used to playback recorded media at a later time, while also having the ability to pause, rewind, and fast-forward through the recorded media.

The media data stored to the DVR can be encrypted in order to protect the media content from unauthorized playback. A processor, which could be a secure microprocessor, associated with the DVR can be used to protect the encryption keys that are used by transport stream encryption processors to encrypt the content. In a typical embodiment, the content is encrypted with a content key, and then the content key itself is then encrypted with the public key of the secure microprocessor. Because the content key is encrypted, it can then be stored outside of the secure microprocessor, such as on a hard drive along with the associated encrypted media content.

Upon request for playback of the media content, the associated encrypted content instance key is retrieved from the storage device and decrypted using the private key of the secure microprocessor. The media content can then be retrieved and the decrypted content key can then be used to decrypt the media data for playback.

However, because the encrypted content key is associated with the private key of a particular secure microprocessor, when a DVR and/or its secure microprocessor fails it is not be possible to access the secure microprocessor to allow decryption of the content key, and to decrypt stored content from the DVR's storage device. Thus, the DVR owner's library of recorded and encrypted media content becomes inaccessible for playback. This may be so, even though the user may be legally entitled to play the media content, e.g., after paying for that right. Additionally, tying the media content to a particular DVR introduces problems with respect to the sharing of digital media between devices. For example, in some cases, a subscriber may be authorized to view content recorded by a first DVR within the subscriber household on another, second media device (i.e. a set-top box or another DVR, among other possible media devices) within the subscriber household. However, because the encrypted media content is tied to the secure microprocessor in the first DVR used to record the media, such sharing becomes difficult.

To allow for recovery of a content key in the event that the original secure microprocessor is destroyed or missing, the content key can be encrypted with the public key of a cable head-end system. Accordingly, a DVR having a new secure microprocessor sends the encrypted content keys on a program-by-program basis to the head-end for decryption and the head-end recovers content keys by decryption with its private key. The content keys can be re-encrypted with the public key of the new secure microprocessor and sent back to the DVR.

However, there are a number of drawbacks to such a recovery scheme. For example, public key encryption and decryption are computationally expensive operations, requiring hundreds of milliseconds (or even seconds) of processor time. Because the public key encryption and decryption of content keys are performed within the secure microprocessor as an atomic operation, they can interfere with other timing-sensitive operations that the secure microprocessor is responsible for, such as conditional access (CA) decryption. This is particularly true if the secure microprocessor is decrypting electronic control messages (ECMs) for multiple streams from the multiple system operator (MSO) network. Additionally, a second problem is that recovery of the original secure microprocessor requires the cable head-end to recover content keys for each and every program on the DVR hard drive. This approach does not scale well in a system with thousands of DVR set tops, each with potentially hundreds of programs to be recovered.

Therefore, what are needed are systems and methods that can potentially address one or more of the aforementioned deficiencies.

BRIEF DESCRIPTION OF THE DRAWINGS

The components in the drawings are not necessarily to scale relative to each other. Like reference numerals designate corresponding parts throughout the several views.

DETAILED DESCRIPTION

The present disclosure relates to a media content encryption scheme that makes use of a two-level symmetric key encryption scheme for media device recording and/or playback. Systems and methods are described for set-up/initialization of a digital media device, subsequent recording and playback on a digital media device, and key recovery. Additionally, embodiments for media sharing between two media devices using the disclosed encryption schemes are also disclosed.

According to embodiments of the present disclosure, reference is made to an escrow key, which may also be designated in the figures and description as "$K_{ESCROW}$." The term escrow is generally known to refer to the concept of a third party holding an object (i.e. money, an instrument, merchandise, assets, etc.) on behalf of at least two other parties in a transaction. A first party gives the object to the third-party escrow, who holds it for a second party until appropriate instructions are given to the third-party escrow or until the third-party escrow knows that the second party has fulfilled particular obligations.

Figure 1:
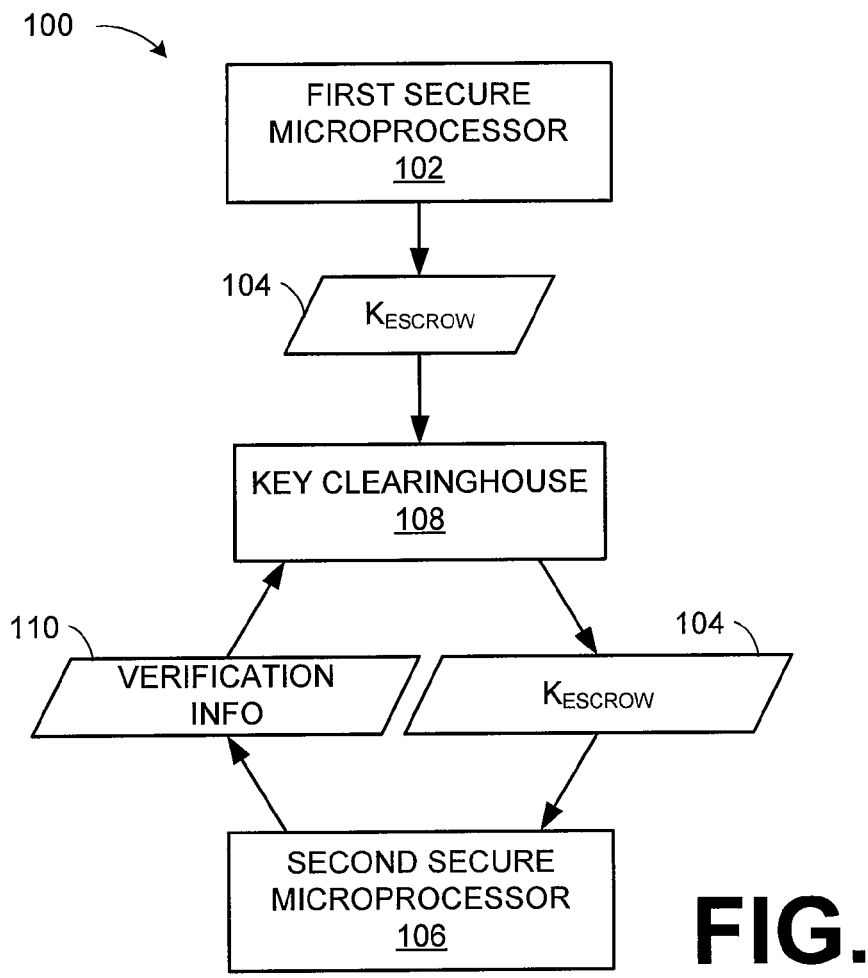
FIG. 1 depicts a simplified block diagram of an embodiment of a secure escrow and recovery system that can be used for managing encryption keys used for securing and accessing media content associated with one or more digital media devices.

Similarly, in the disclosed embodiments, the escrow key $K_{ESCRO}$ can be viewed as the object in an escrow transaction. FIG. 1 depicts a simplified block diagram of an embodiment of a secure escrow and recovery system 100 that can be used for managing encryption keys used for securing and accessing media content associated with one or more digital media devices, such as a DVR set top, among other devices capable of recording and/or playback of digital media.

The keys can be managed, in part, using secure microprocessors. Secure microprocessors, or other secure encryption devices, may be configured as a physically secure environment such that, subsequent to manufacture, operations within the secure microprocessor are unobservable. More specifically, in at least one embodiment, the secure microprocessor can be viewed as a secure environment, where calculations and other operations performed within the secure environment are not viewable by other components outside of the secure microprocessor.

A first secure microprocessor 102 (i.e. of a media device, such as a DVR) generates an escrow key 104, which is used for encrypting content keys that are used for encrypting instances of media content. The escrow key is ultimately to be provided to a second secure microprocessor 106. However, a third party escrow, here referred to as key clearinghouse 108, can be used to perform the function of preventing the second secure microprocessor 106 from accessing the escrow key 104, (i.e. physically, using encryption, etc.) until certain obligations are met. In some embodiments, key clearinghouse 108 could be, for example, a cable head-end or other remote server that is communicatively coupled to the first and second microprocessors.

An exemplary obligation that key clearinghouse 108 enforces is a verification that the second secure microprocessor 106 has the necessary permissions to access the escrow key $K_{ESCRO}$. Such permissions may be dictated by digital rights management (DRM) criteria and/or other media content authorization logic. According to some embodiments, the second secure microprocessor 106 sends verification information 110 to the key clearinghouse 108, which could include identification information of the first secure microprocessor 102, among others. Key clearinghouse 108 then verifies that the second secure microprocessor 106 and/or its associated media device has the appropriate permissions (i.e. satisfied the proper obligations) to access the escrow key $K_{ESCRO}$ 104. Accordingly, if the second secure microprocessor 106 is deemed to have the necessary permissions, $K_{ESCRO}$ 104 is transmitted to the second secure microprocessor 106 to allow it to decrypt content keys which can be used to decrypt media content encrypted by the first secure microprocessor 102.

In some instances, although the first secure microprocessor 102 generates the escrow key $K_{ESCRO}$ 104, it is not necessary that the first secure microprocessor 102 or its associated media device transmit the escrow key $K_{ESCRO}$ 104 to key clearinghouse 108. Rather, $K_{ESCRO}$ 104 can be encrypted by the first secure microprocessor 102 such that the second secure microprocessor 106 can not directly access the $K_{ESCRO}$ 104. Thus, the second secure microprocessor 106 could be allowed access to the encrypted escrow key $K_{ESCROW}$ 104 without satisfying any particular obligations. For example, among other possibilities, a storage device holding the encrypted $K_{ESCRO}$ 104 could be made accessible to the second secure microprocessor. However in order to access the escrow key $K_{ESCRO}$ 104 in the clear, key clearinghouse 108 is used for decrypting the escrow key $K_{ESCROW}$ 104 and providing it to the second secure microprocessor 106.

Once obtained in the clear, the escrow key $K_{ESCRO}$ 104 can be used by the second secure microprocessor 106 to decrypt the content keys that were used to encrypt the instances of media content. The recovered content keys can then be used for decrypting the associated instance of media content.

Systems and methods that describe such an operation in more detail, among other embodiments, are described herein. It should be understood that, omitted from the figures are, in accordance with some embodiments, a number of conventional components known to those skilled in the art that are unnecessary to explain the operation of the disclosed systems and methods for secure escrow and recovery of media device content keys.

Figure 2:
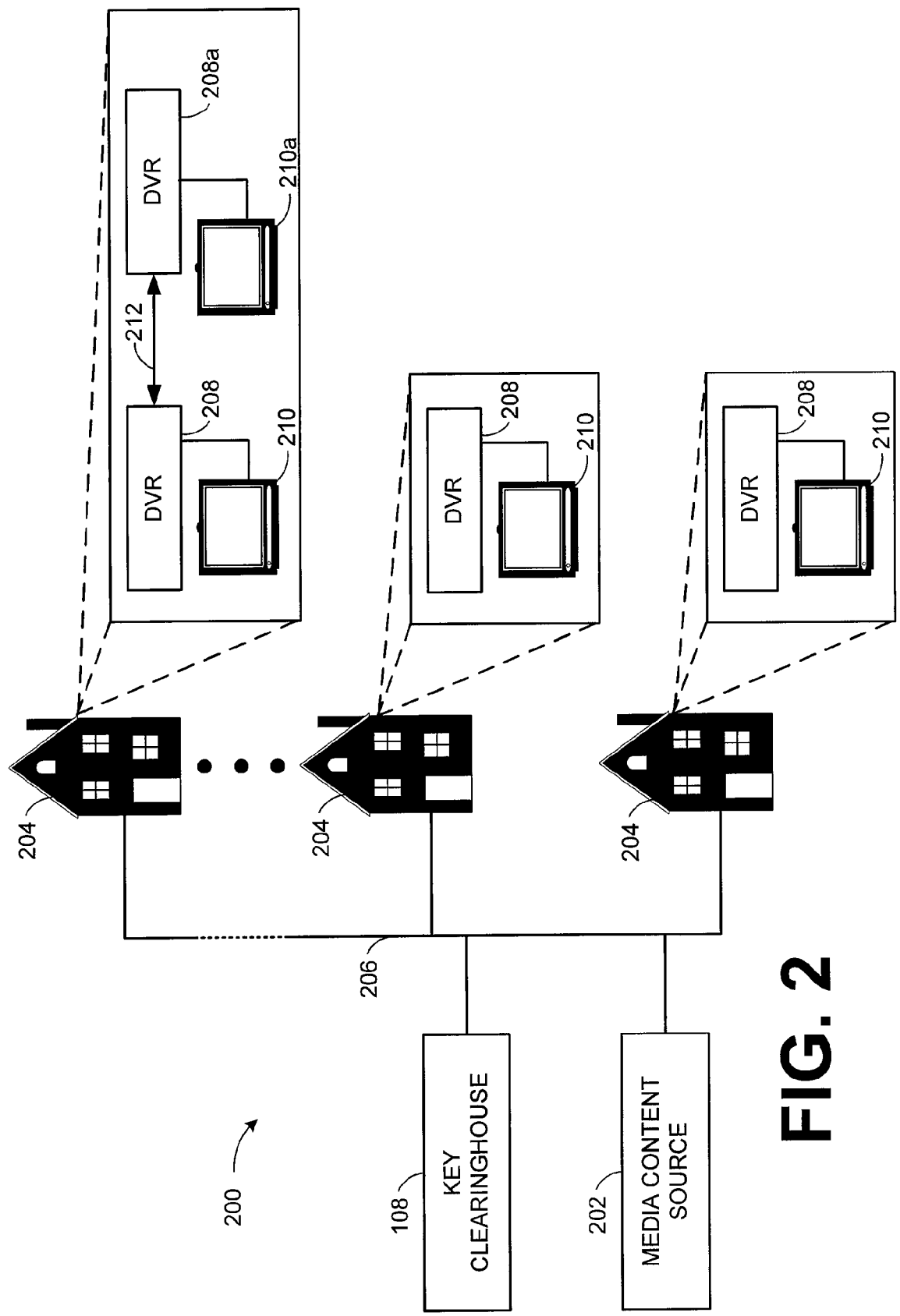
FIG. 2 depicts a block diagram of an exemplary arrangement of a secure escrow and recovery system depicted in the diagram of FIG. 1.

FIG. 2 depicts a secure escrow and recovery system 100 in which embodiments of the described secure escrow and recovery of media device content keys may be implemented. System 100 may be used, among other purposes, for coordinating the exchange of information capable of being used to secure media content stored on devices located remote from a media content source, such as, among others, a cable-television or digital satellite television provider, for example.

Media content could comprise audio, video, images, text, teletext, among others. According to some embodiments, media content, as referred to herein, may also be referred to as media programs or media programming. Some examples of media programming used herein include, but are not be intended to be limited to, television programs and radio programs. Such television programs and/or radio programs could be scheduled broadcasts or delivered to a user on-demand (e.g. such as provided with a video-on demand system). The media content could be unicast to a single user, or could be multi-cast or otherwise broadcast to multiple users.

An instance of media content (or media programming, etc.) could be, for example, a television show (e.g. an episode of Smallville) or other segment of recorded media content. A series of media programming could be, for example, a number of episodes of a television show (e.g. the last five recordings of Smallville). The media content can be received and recorded by the remote devices. For example, the media content can be stored to a storage medium as media data. In some instances, such media data is encoded audio and/or video signals, among other potential representations of the media content that is in a form suitable for processing by media devices.

According to some embodiments, media content source 202 delivers media content to a number of remote devices over a transmission medium 206, which may be one or more of, among others, twisted-pair telephone wire, coaxial cable, optical fiber, over-the-air waves, etc. The remote devices may be located at, for example, user premises 104.

Accordingly, the media content may be received by a remote device within the user premises 204 that is capable of receiving and, possibly, decoding the media content. The remote device may, for example, form part of, be associated with, or be integrated in one or more of a cable-television set-top box, a television, portable device, digital video recorder (DVR), personal video recorder (PVR), a personal digital recorder (PDR), and/or a personal computer, laptop computer, or personal digital assistant (PDA), among others.

For the purposes of illustration, one such remote device configured to execute media recording capabilities is DVR 208. DVR 208 may be configured to record received media content and store associated media data on a storage medium. According to some embodiments, the media data may be later accessed for playback on a playback device, such as television 210, at a later time. The playback device could also be one or more of a computer monitor, an audio receiver, or other device capable of emitting sound or images pertaining to the media content.

According to some embodiments, in addition to DVR 208, a user premises 204 can have other media devices (i.e. other DVR'S, cable set-top boxes or other digital media receivers, etc.). According to some embodiments, these other media receivers can be in communication with DVR 208. Depicted in the upper right portion of FIG. 2, for example, a second DVR 208a is associated with the respective user premises. DVR 208a, according to some embodiments, is associated with a respective display device 210a. In some instances, DVR 208a is in communication with DVR 208 over communication medium 212. For example, the communication medium 212 could be twisted pair, Ethernet, or any type of wired or wireless network. DVR 208 and DVR 208a, and any other DVRs that may be present at user premises 204, may communicate directly or through one or more other devices in a local-area-network (LAN). In some cases, DVRs 208 and 208a can share media content and/or programming guide information, among other DVR related information, over the communication medium 212.

Although embodiments are described within the environment of a cable-television system, it should be understood that other media delivery and/or receiving devices are intended to fall within the scope of the invention. For example, the media content source 202 could be a satellite television provider or even a media server on the Internet. The remote device could be a satellite television decoder, a computer configured to receive the media content, or could be any device, such as a personal computer, that is configured with media recording and/or playback ability. Additionally, although the media content may be described as comprising video and audio content, some embodiments may include only audio or only video. The media content could even comprise text or other forms of media. Further, in some instances, non-media information (e.g. security keys, digital-rights management (DRM) information, etc.) may be transmitted along with the media content.

According to some embodiments, as briefly described above, key clearinghouse 108 prevents or provides access to an escrow key that has been used to encrypt other keys (i.e. content keys) used to encrypt instances of media content. Thus, in some embodiments, key clearinghouse 108 facilitates secure escrow and/or recovery of media device content keys. Although in some embodiments key clearinghouse 108 stores the escrow keys in order to facilitate later recovery, in some embodiments key clearinghouse 108 does not store the escrow key at all before recovery is requested. Rather, in the latter case, key clearinghouse 108 is configured to recover content keys when provided with the encrypted escrow key.

Key clearinghouse 108 and/or media content source 202 may form or be associated with, among others, a cable head-end system or other remote media delivery system. However, in some embodiments, key clearinghouse 108 is any device communicatively coupled to the respective DVRs 208. For example, DVRs 208 can communicate with key clearinghouse 108 over a network, such as a LAN, WAN, and/or the Internet. It is not necessary that key clearinghouse 108 be associated with the media content source 202.

Figure 3:
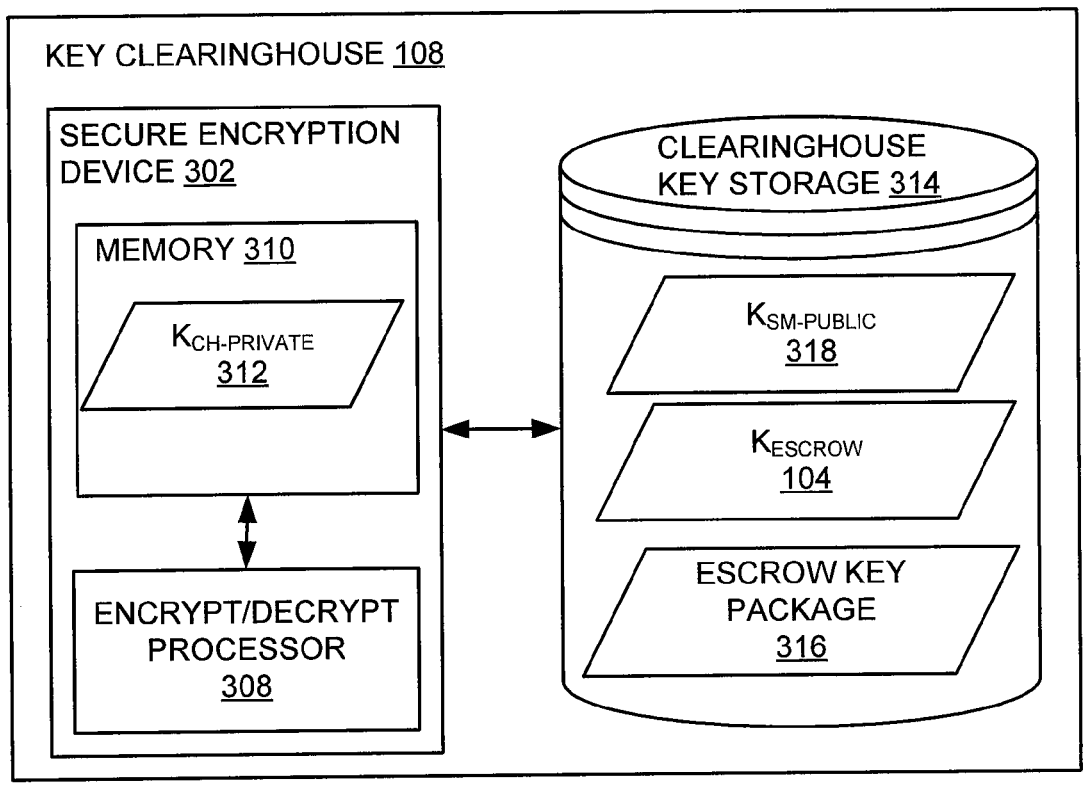
FIG. 3 depicts a block diagram of selected system components of a key clearinghouse of the secure escrow and recovery system of FIG. 1.

FIG. 3 depicts a simplified block diagram of the key clearinghouse 108 of the secure escrow and recovery system 200 of FIG. 2. Associated with the key clearinghouse 108 is a secure encryption device 302 and a clearinghouse key storage 314. Secure encryption device 302 includes memory 310 for holding a plurality of keys used for encrypting and decrypting data. For example, memory 310 may store a private key $K_{CH\text{-}PRIVATE}$ 312 of the key clearinghouse 108.

Secure encryption device 302 may further include an encryption/decryption processor 308 for retrieving keys and using them to encrypt and decrypt data transmitted between one or more DVRs 208. According to some embodiments, clearinghouse key storage 314 is used to store, among others, one or more escrow keys 104 that are associated with the one or more DVRs 208. In some embodiments, escrow keys are stored securely (i.e. encrypted) in an escrow key package 316. Clearinghouse key storage 314 can also store public keys 318 (designated as "$K_{SM\text{-}PUBLIC}$") associated with each secure microprocessor of DVRs 208.

Figure 4:
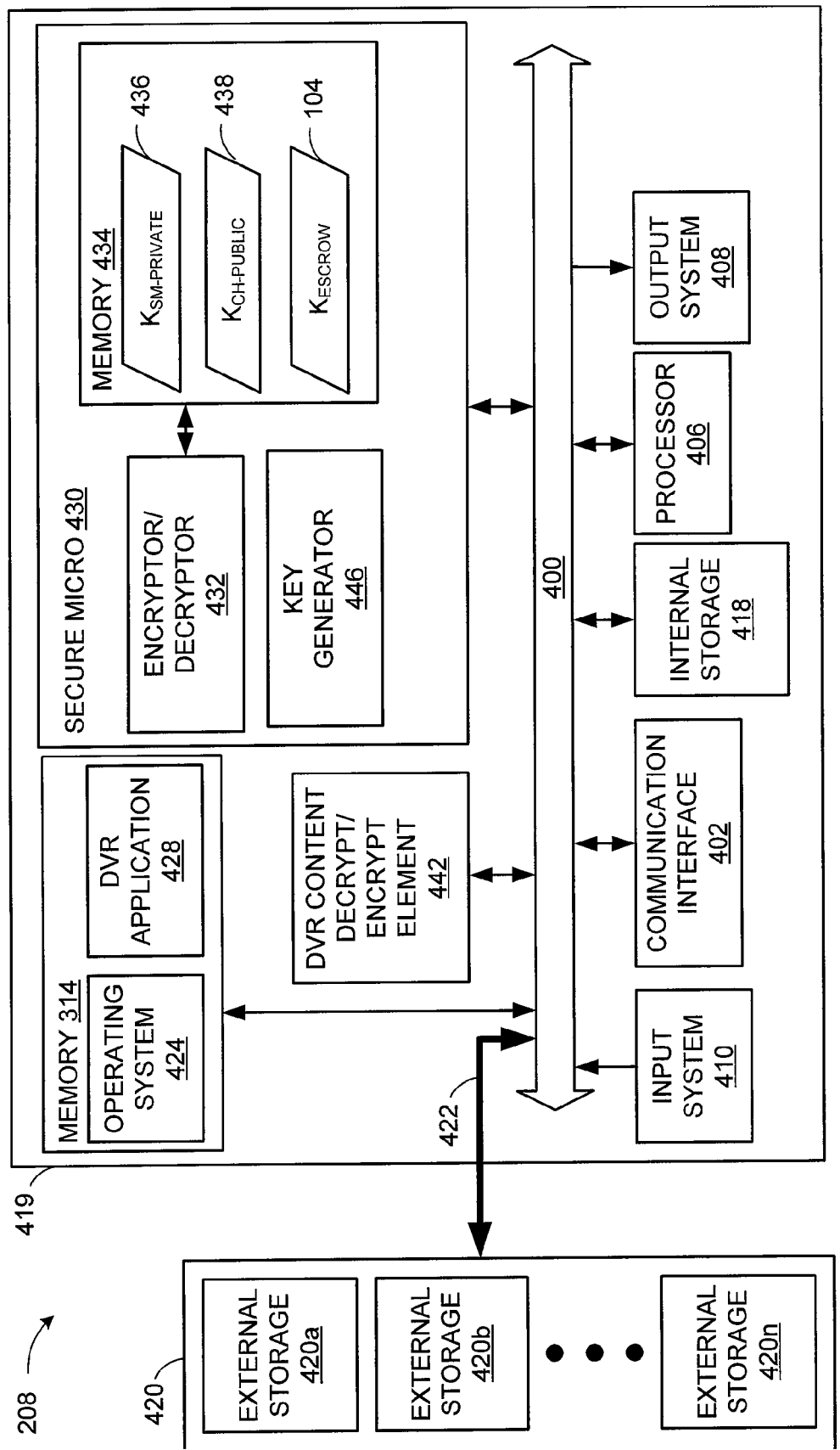
FIG. 4 depicts a block diagram of selected system components of an exemplary embodiment of a remote device such as the digital-video recorder (DVR) of FIG. 2.

FIG. 4 is a block diagram depicting selected system components of an exemplary embodiment of the DVR 208 of FIG. 2. FIG. 4 depicts several components commonly communicating through a local bus 400. For example, DVR 208 may include a communications interface 402 for receiving video, audio and other media signals from a media signal source, such as the media content source 202 (FIGS. 1 and 2). The communication interface 402 may include a tuner system (not depicted) which could include, for example, a tuner for receiving and selecting one or more selected channels or digital streams of media signals. Such a tuner system can tune to a particular television station or digital stream, and the media signals associated with this station or stream can be recorded by the DVR 208.

DVR 208 can further include at least one processor 406 for controlling the operations of the DVR 208 and an output system 408 for driving a playback device (e.g., television 210). An input system 410 can receive user inputs provided via a wired or wireless input device such as, for example, a hand-held remote control, a transmitter with buttons or keys located on the exterior of the DVR, and/or a keyboard.

According to some embodiments, communication interface 402 transmits and/or receives data over a network such as a LAN, WAN, or the Internet. For example, data may be transferred to/from another DVR, received from media content source 202 (FIG. 2), or from a centralized server through communication interface 412. Such data could be media signals and or other data, such as programming information, or other data capable of being stored and or displayed to the user. Network interface 312 may comprise, for example, an Ethernet interface, an IEEE-1394 interface, a USB (Universal Serial Bus) interface, a serial interface, a parallel interface, a wireless radio frequency (RF) interface, a telephone line interface, a power line interface, a coaxial cable interface, and/or an infrared (IR) interface, among others.

Memory 414, which may include volatile and/or non-volatile memory, can store one or more programmed software applications, herein referred to as applications, which contain instructions that may be executed by processor 406 under the direction of operating system 424. Input data used by an application can be stored in memory 414 and read by processor 406 as needed during the course of the application's execution. This input data may be data stored in memory 414 by a secondary application or other source, either internal or external to DVR 208, or may be data that was created with the application at the time it was generated as a software application program.

Internal storage 418 may comprise a recordable medium and may be a number of devices available for non-volatile data storage, such as a hard disk drive (HDD), optical drive, or flash memory, for example. Internal storage 418 may be used for storing data, including media data and non-media data. Media data could represent media content received through communication interface 402. According to some embodiments, it should be understood that media programming can be digitally encoded before being stored on recordable medium by the DVR itself or by means external from the DVR, such as the media signal source or a cable set-top box. In some embodiments, internal storage 418 is also used for storing non-media data, such as encryption keys, DRM information, and programming guide information associated with stored media data.

Like internal storage 418, external storage 420 also comprises a recordable medium and may be a number of devices available for non-volatile data storage, such as an HDD, optical drive, or flash memory, for example. However, unlike internal storage 418, which is located within the DVR enclosure (i.e. housing) 419, external storage 420 can be removably attached to DVR 208 through a communications interface 422, which could be any number of wireless or wired interfaces, for example.

Although only one external storage device may be used in some embodiments, it is contemplated that external storage 420 may comprise a plurality of storage devices 420a-420n. For example, devices 420a-420n could be a plurality of HDDs. It can be appreciated that the one or more HDDs could be daisy chained, or otherwise linked, to communicate with DVR 208 over the communications interface 422.

Although memory 414, internal storage 418, and/or external storage 420 have been described as potentially performing particular functions, according to some embodiments, these particular functions could be shared, or carried out completely, by any other of the memory and/or storage devices.

Communication interface 422 could be a bus operating under the Advanced Technology Attachment (ATA) standard, and more specifically, the Serial-ATA (i.e. SATA) standard version 2.5, which is available from the Serial ATA International Organization and is hereby incorporated by reference in its entirety. According to such an embodiment, DVR 208 may include a communications interface comprising an attachment port on the housing 419 of the DVR that cooperatively mates with the plug of external storage 420. A cable complying with the high-speed bus (i.e. a cable complying with the SATA standards) may provide the transmission medium between external storage 420 and the DVR 208. According to other embodiments, communications interface 422 could be a bus complying with the IEEE 1394 (Firewire), the Universal Serial Bus (USB), or IEEE 802.11 standards. It can be appreciated that a number of other communication interfaces 422 could be used.

One, or both of, internal storage 418 and/or external storage 420 could be used for recording media content to a transportable medium that is capable of being easily moved between a plurality of remote devices. For example, internal storage 418 and/or external storage 420 may be an optical drive configured to read and/or record to/from an optical medium. The transportable medium could also be flash memory such as used in USB thumb drives, smart digital (SD) memory or compact flash (CF) memory, among others. Accordingly, DVR 208 may be configured to record media data, which could comprise moving or copying media data from other storage devices, to the transportable medium. DVR 208 may also be configured to read media data from a transportable medium. Accordingly, the media data may be stored to a transportable medium, and the media data on the transportable medium may then be read by other devices, such as another DVR associated with a customer account. In that the media data is encrypted, embodiments disclosed herein describe systems and methods for sharing the media content between remote devices while maintaining the ability to decrypt the underlying media data by authorized devices.

User input received during the course of execution of any processes implemented by DVR 208 may be received from an input device (not shown) via input system 410, transmitted through the bus 400, temporarily stored within memory 414, and communicated to processor 406. Data generated by an application can be stored in memory 414 by processor 406 during the course of the application's execution. Availability, location, and amount of data generated by one application for consumption by another application can be communicated by messages through the services of operating system 424.

Under user instruction, DVR application 428 can perform the general tasks of recording and/or playback of received programs, among other tasks. DVR application 428 can also provide a navigation framework for services provided by DVR 208. For example DVR application 428 can register for, and in some case reserve, certain user inputs related to navigational keys such as channel increment/decrement, last channel, favorite channel, etc. DVR application 428 also provides users with television (or other programming) related menu options that correspond to DVR functions such as, for example, providing an interactive program guide, blocking a channel or a group of channels from being displayed in a channel menu, recording particular channels, playback of recorded shows, etc.

Portions of DVR application 428 and/or operating system 424 may also facilitate the encoding/decoding and/or encrypting/decrypting of media data and/or other information used in the described systems and methods for securing media content using an interchangeable encryption key. Specifically, operating system 424 or DVR application 428 may use a secure element, depicted as secure microprocessor 430, and/or DVR content decrypt/encrypt element 442 to perform such encryption and/or decryption.

For example, DVR content decrypt/encrypt element 442 includes a processor for performing encryption and/or decryption of media content. For example, decrypt/encrypt element 442 can decrypt the media content received from the media content source 202 (FIG. 2) or from other DVR components, such as internal storage 418 or external storage 420. DVR content decrypt/encrypt element 442 also encrypts and/or re-encrypts media content for storage to the internal or external storage mediums.

According to some embodiments, DVR content decrypt/encrypt element 442 can obtain keys for performing such encryption and decryption of media content from secure microprocessor 430. Secure microprocessor 430 may include a processor, such as encryptor/decryptor 432, for encrypting and decrypting keys used by DVR content decrypt/encrypt element 442 to perform encryption and decryption of media content.

In some embodiments, secure microprocessor 430 includes a memory 434 for storing a number of keys for encryption and/or decryption functions. For example, memory 434 can include a private key $K_{SM-PRIVATE}$ 436 stored therein, and one or more escrow key storage locations for the storage of a respective escrow key $K_{ESCRO}$ 104 and a storage location for storing the public key of the key clearinghouse 108, designated as $K_{CH-PUBLIC}$ key 438.

Private key $K_{SM-PRIVATE}$ 436 can be used to decrypt data encrypted with a public key $K_{SM-PUBLIC}$ (not depicted) associated with the private key $K_{SM-PRIVATE}$ 436. According to such embodiments, private key 436 is typically kept from being exposed outside of the secure microprocessor 430 in clear form. The public key of the key clearinghouse $K_{CH-PUBLIC}$ key 438 could be pre-programmed, but is typically downloaded from the key clearinghouse 108 or other source. The public key of the key clearinghouse $K_{CH-PUBLIC}$ key 438 can be used to decrypt and/or verify that transmissions received from key clearinghouse 108 are from a trusted source. The one or more escrow key storage locations for the storage of a respective escrow key $K_{ESCRO}$ 104 can store keys generated by the secure microprocessor 430, and/or those generated by another secure microprocessor. Accordingly, in some embodiments, secure microprocessor 430 also includes a key generator 446 for generating keys, such as an escrow key.

The applications executed by DVR 208 can comprise executable instructions for implementing logical functions. The applications can be embodied in any computer-readable medium for use by or in connection with an instruction execution system. The instruction execution system may be, for example, a computer-based system, a processor-containing system, or any other system capable of executing instructions. In the context of this document, a "computer-readable medium" can be any means that can contain, store, communicate, propagate, or transport the program for use by or in connection with the instruction execution system, apparatus, or device.

The computer-readable medium can be, for example, but is not limited to, an electronic, solid-state, magnetic, optical, electromagnetic, infrared, or semiconductor system, apparatus, device, or propagation medium, either internal to DVR 208 or externally connected to the DVR 208 via one or more communication ports or network interfaces. More specific examples (a non-exhaustive list) of the computer-readable medium would include the following: an electrical connection (electronic) having one or more wires, a portable computer diskette (magnetic), a hard drive storage device (magnetic), a random access memory (RAM) (solid-state device), a read-only memory (ROM) (solid-state device), an erasable programmable read-only memory (EPROM or Flash memory) (multiple devices), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 5:
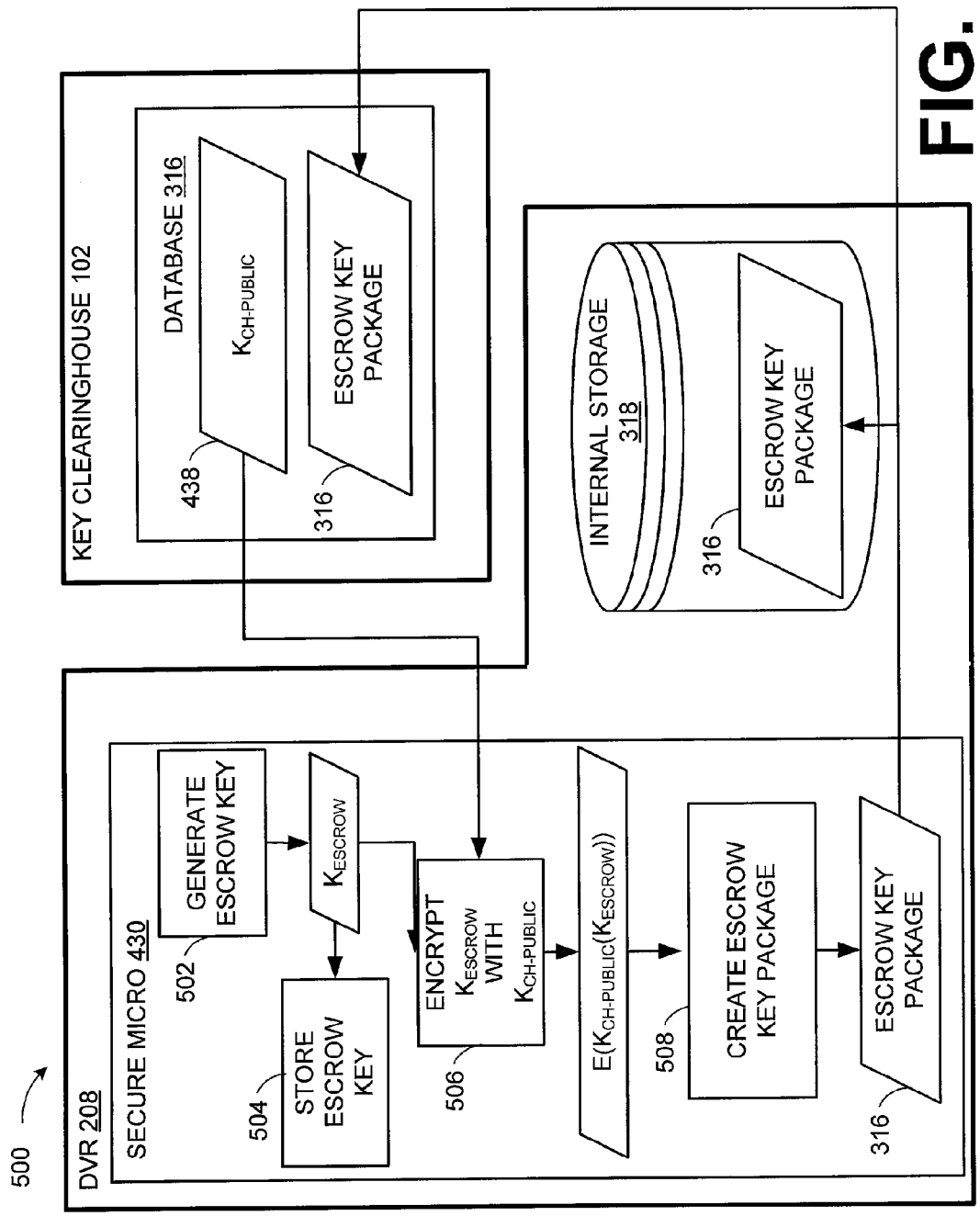
FIG. 5 depicts a data flow diagram illustrating an embodiment of a system and/or method for initializing a secure microprocessor with an escrow key.

Now that a general overview of the various components of a system for secure escrow and recovery of media device content keys has been described, FIG. 5 depicts a data flow diagram illustrating an embodiment of a system and/or method for initializing a secure microprocessor with an escrow key.

At block 502 a secure microprocessor 430 of DVR 208 generates an escrow key $K_{ESCROW}$. At block 504 the secure microprocessor 430 stores the escrow key $K_{ESCRO}$ into an escrow key storage location of memory 434 (FIG. 4). The escrow key, in some embodiments, is a strong symmetric key. For example, among others, triple data encryption standard (3-DES) and advanced encryption standard (AES) are strong symmetric ciphers, given keys of sufficient length.

According to some embodiments, the secure microprocessor 430 does not release the escrow key $K_{ESCRO}$ in decrypted form. Instead, at block 506, the escrow key $K_{ESCROW}$ is encrypted with the public key $K_{CH-PUBLIC}$ 316 of key clearinghouse 108 to produce $E(K_{CH-PUBLIC}(K_{ESCROW}))$. In some embodiments, DVR 208 may request the key clearinghouse public key and the key may be transmitted in response to such a request. However, in some embodiments, DVR 208 has been provided with the public key of key clearinghouse 108 previously.

Once the escrow key $K_{ESCRO}$ is encrypted with the public key $K_{CH-PUBLIC}$ 438 of key clearinghouse 108, an escrow key package is created at block 508, which contains the encrypted escrow key. Specifically, in some embodiments, at block 508 the secure microprocessor 430 appends the current time and its identity to the encrypted escrow key $E(K_{CH-PUBLIC}(K_{ESCROW}))$ and then signs the entire message with its private key (i.e., $K_{SM-PRIVATE}$ 436; FIG. 4) to produce the escrow key package. Accordingly, the signed encrypted message, which is referred to as an escrow key package, is then stored outside of the secure microprocessor 430. For example, the escrow key package can be stored to internal storage 418, or other devices associated with DVR 208, and/or outside of DVR 208, such as within clearinghouse key storage 314. According to such an embodiment, DVR 208 can transmit the escrow key package over communications medium 206 to key clearinghouse 108.

Accordingly, once the initialization process has completed, an escrow key has been created and stored within secure microprocessor 430. Additionally, in some embodiments, the escrow key has been encrypted with an asymmetric key, such as the public key of key clearinghouse 108. The encrypted escrow key is then securely stored along with an identification of the secure microprocessor from which it was created and a time stamp. Because the escrow key (i.e. escrow key package 316) is stored outside of the secure microprocessor in an encrypted state, only key clearinghouse 108, or another entity having the private key capable of decrypting the escrow key package 316, is able to easily access the escrow key stored therein.

Figure 6:
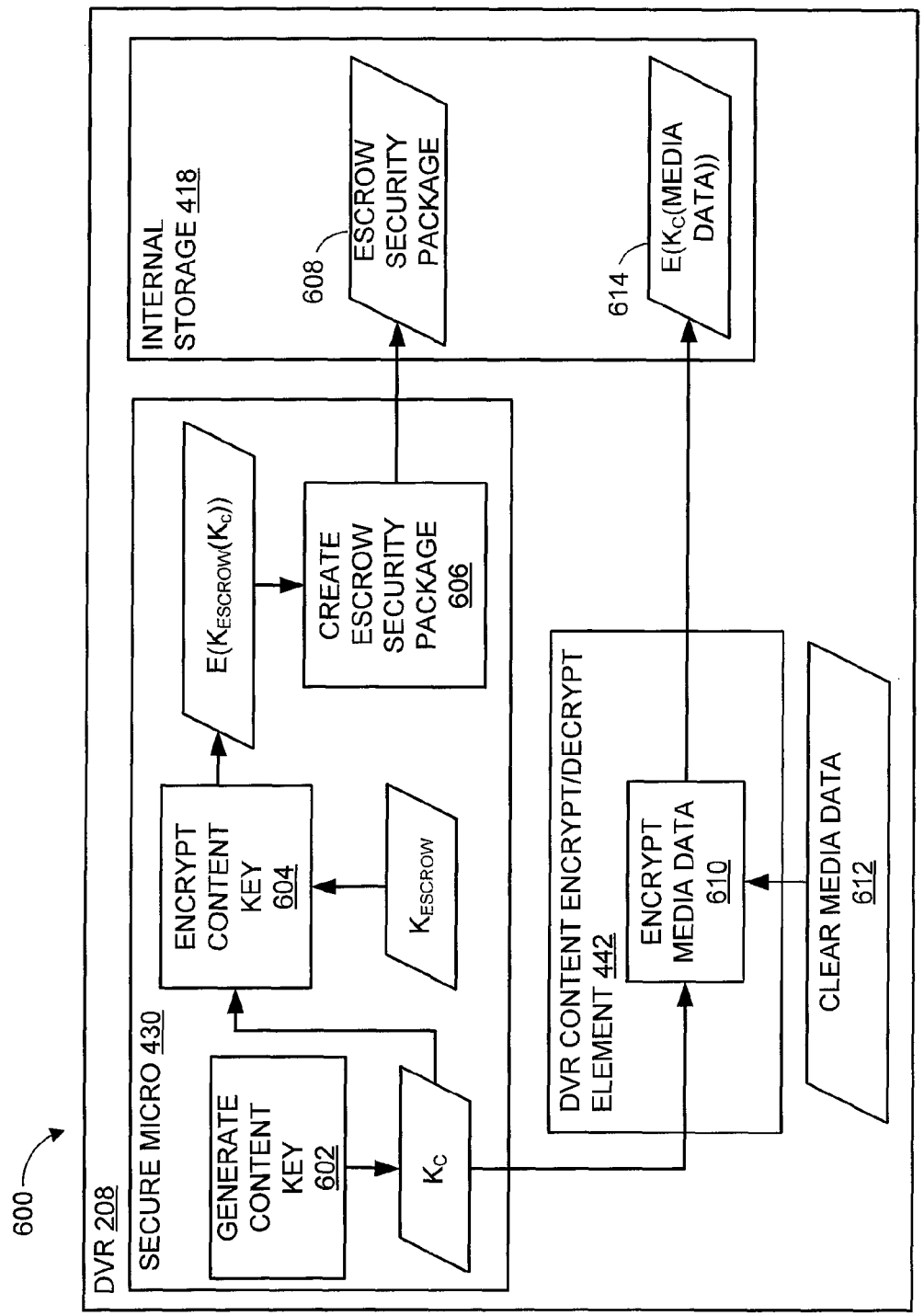
FIG. 6 depicts a data flow diagram representing an embodiment for using the escrow key of FIG. 5 for securing media content encrypted by the DVR of FIG. 4.

FIG. 6 depicts a data flow diagram representing an embodiment 600 for using the escrow key for securing media content encrypted by the DVR 208. Upon starting a recording, the secure microprocessor 430 creates an escrow security package 608 for the instance of media content. The escrow security package 608 can include, among other information, DRM information, the identity of the secure microprocessor 430 used to generate the escrow security package, the encrypted content key and the secure microprocessor signature to prevent tampering with the escrow security package.

More specifically, at block 602, a content key used for encrypting an associated instance of media data, designated as $K_C$, is generated. At block 604 the content key is encrypted with the escrow key $K_{ESCRO}$ previously stored within the memory 434 of secure microprocessor 430 to produce $E(K_{ESCROW}(K_C))$. Then, at block 606, the escrow security package 608 is created which, in some embodiments, includes the DRM rights, identity of the secure microprocessor, the encrypted content key and/or the secure microprocessor signature. The escrow security package can be signed using the secure microprocessor private key, to prevent tampering. The escrow security package 608 is then stored outside of the secure microprocessor, such as to internal storage 418.

At a time after content key $K_c$ is generated at block 602, the content key $K_c$ can be provided to DVR content encryption/decryption element 442 which is used to encrypt the instance of media content. Specifically, at block 610, clear media data 612, representing the instance of media content, is encrypted with the content key $K_C$ and the encrypted media content 614, here designated as $E(K_C(\text{MEDIA DATA}))$, is then stored outside of the DVR content encryption/decryption element 442. For example, the encrypted media content 614 can be stored to internal storage 418.

Figure 7:
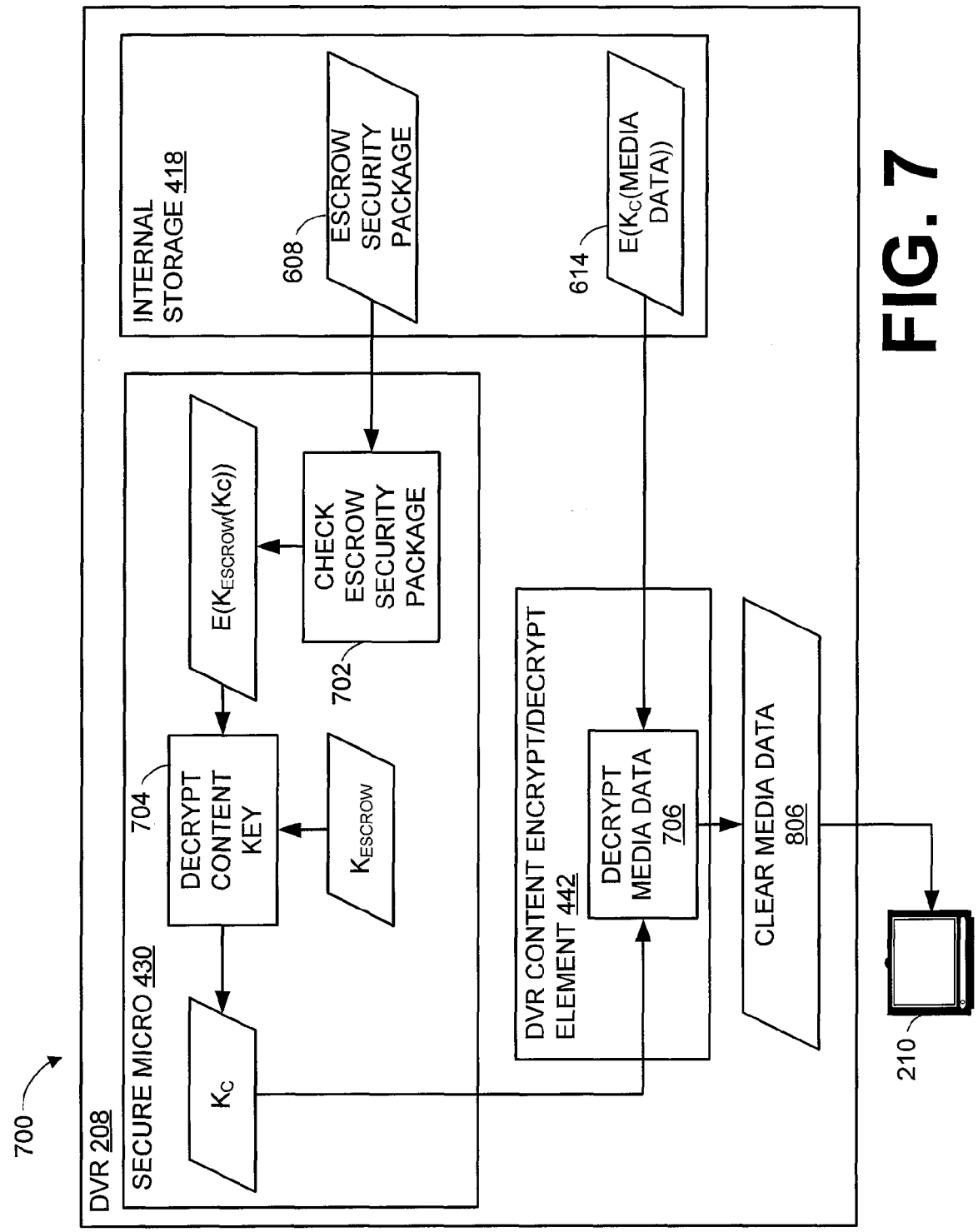
FIG. 7 depicts a data flow diagram representing an embodiment for using the escrow key of FIG. 5 for playback of encrypted media content on the DVR of FIG. 4.

FIG. 7 depicts a data flow diagram representing an embodiment 700 for using the escrow key for playback of encrypted media content. Although the present embodiment is described in terms of an embodiment for playback of media content, such an embodiment could also be used in other situations where access to clear media data is needed. At block 702, the escrow security package that contains the content key associated with the desired media content to be played is delivered to the secure microprocessor 430 of DVR 208. At this time, the escrow security package 608 can be checked for tampering (e.g. by verifying the signature on the escrow security package 608). At block 704, once the escrow security package 608 has been checked, secure microprocessor 430 decrypts the content key with the escrow key at block 704. The content key $K_C$ associated with the desired media data can then be delivered to DVR content encrypt/decrypt element 442, preferably through a secure connection.

At block 706, after receiving the encrypted media data $E(K_C(\text{MEDIA DATA}))$ from internal storage 418, the media data is decrypted. Specifically, because the media data is stored as encrypted with the content key, the content key delivered by secure microprocessor 430 can be used to decrypt the encrypted media data into clear media data 708, which represents the desired media content. The clear media data 708 could be used for a number of different purposes. However, in this case, the clear media 806 data is provided from DVR 208 to television 210.

Accordingly, embodiments for initializing a DVR having an escrow key, using a DVR for the encryption of media data using the escrow key, and using the DVR for decrypting previously recorded content with the escrow key have been described. However, at some point the original secure microprocessor 430 may not be available for decrypting media data stored to an associated storage device. For example, if the secure microprocessor 430 malfunctions, a new secure microprocessor may be installed within the DVR 208. According to another instance, encrypted media data encrypted by a first secure microprocessor may be accessed by a second secure microprocessor, which may be in another DVR, for example. However, in both of these cases, the original secure microprocessor is no longer available to decrypt the escrow security package that is associated with the media data. Accordingly, because a different secure microprocessor does not have access to the original escrow key used to encrypt the content key $K_C$ located in the escrow security package, the associated encrypted media data representing desired media content is no longer accessible. A number of other scenarios in which this might occur include an MSO upgrading the conditional access system (CAS) or a replacement of the entire set top (where the subscriber keeps the content).

Notably, the escrow key package 316 (FIG. 5) is not required for use in recording and/or playback. Rather, the escrow key package 316 is used during a key recovery process, which is described below.

Figure 8:
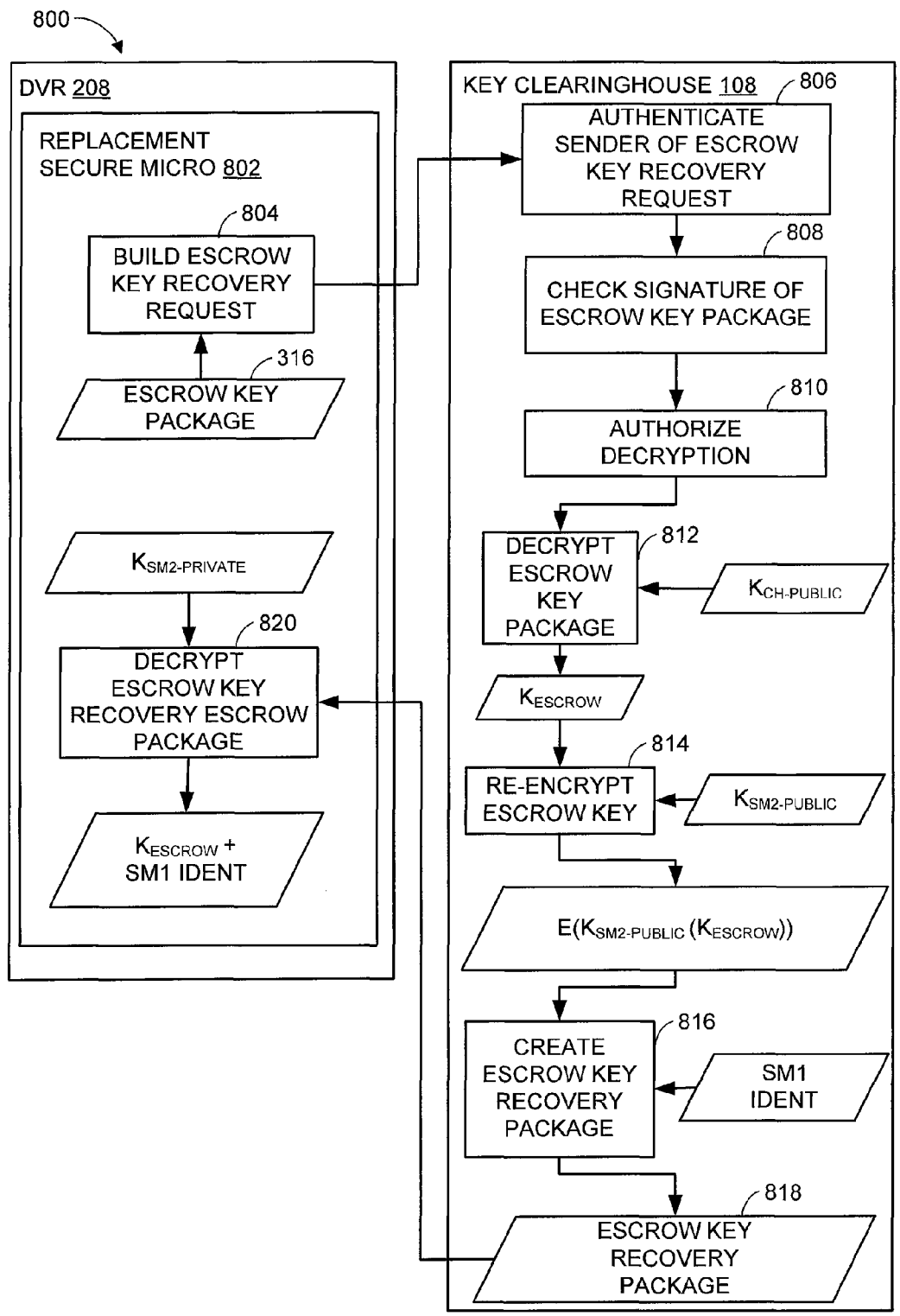
FIG. 8 depicts a data flow diagram representing an embodiment of a content recovery process that could be used to allow a replacement secure microprocessor to access media content encrypted previously by the original secure microprocessor.

Accordingly, FIG. 8 depicts a data flow diagram representing an embodiment 800 of a content recovery process that could be used to allow a replacement secure microprocessor to access media content encrypted previously by the secure microprocessor 430. In the instant case, it is assumed that the DVR 208 is the same DVR used to record the media content as described with respect to embodiment 600 of FIG. 6. However, DVR 208 now includes a second, replacement secure microprocessor 802 which replaces the original secure microprocessor 430. However, it should be understood that the entire DVR 208 could have been replaced, assuming the original encrypted media data and escrow security packages are retained. For example, the escrow security package and encrypted media data may be stored on an external drive 420 and attached to the new DVR or a user or technician could install internal storage 418 within the new DVR. According to yet another embodiment, the encrypted media data representing an instance of desired media content and an associated escrow security package could be recorded to readily removable media, such as a CD ROM or DVD ROM, and made available to the DVR 208.

At block 804 an escrow key recovery request is built. Specifically, according to one embodiment, an escrow key recovery request includes the escrow key package 316. However, if the escrow key package is already stored at key clearinghouse 108 it is not necessary to send the escrow key package 316 to the key clearinghouse. The escrow key recovery request can also include the identification of the replacement secure microprocessor 802, which could be a serial number or other unique identifier.

According to embodiments in which the escrow security package is stored at the key clearinghouse, the escrow security package can include information used to identify the escrow security package that contains the needed escrow key. For example, identity information can be provided with the escrow key recovery request that matches information associated with an escrow key recovery package stored at the key clearinghouse. According to some embodiments, the identify information could comprise one or more of an identification of the secure microprocessor associated with the desired escrow key, timestamps, and/or serial numbers, among other identifying information.

The escrow key recovery request is then transmitted to key clearinghouse 108 where, at block 806 the key clearinghouse authenticates the sender of the escrow key recovery request to confirm the identity of the replacement secure microprocessor 802. At block 808, the key clearinghouse checks the signature on the escrow key package 316 to confirm the identity of the original secure microprocessor. At block 810, the key clearinghouse 108 determines whether the replacement secure microprocessor 802 is authorized to decrypt content on behalf of the original secure microprocessor. At block 812, assuming that the replacement secure microprocessor 802 is authorized to decrypt the media content, the escrow key package 316 is decrypted using the public key $K_{CH\text{-}PUBLIC}$ of the key clearinghouse 108 to produce the escrow key $K_{ESCRO}$. At block 814, the escrow key is re-encrypted with the public key of the replacement secure microprocessor 804, here designated as $K_{SM2\text{-}PUBLIC}$ to produce $E(K_{SM2\text{-}PUBLIC}(K_{ESCROW}))$.

At block 816, an escrow key recovery package 818 is generated, which includes the newly encrypted escrow key $E(K_{SM2\text{-}PUBLIC}(K_{ESCROW}))$ as well as the identity of the original secure microprocessor 430 (i.e. "SM1 Ident" in FIG. 8).

The escrow key recovery package 818 is then transmitted back to DVR 208 where replacement secure microprocessor 802 uses its private key $K_{SM2\text{-}PRIVATE}$ to decrypt the escrow key recovery package at block 820 to obtain the escrow key $K_{ESCRO}$ along with the identification ("SM1 IDENT") of the original secure microprocessor 430.

Accordingly, now that the replacement secure microprocessor 802 has the identification and original escrow key of the original secure microprocessor 430, the replacement secure microprocessor 804 can now decrypt any escrow security packages 608 created using the original secure microprocessor 430. That is, because escrow security packages 608 contain the content keys as encrypted by $K_{ESCRO}$, the replacement secure microprocessor 802 uses the recovered $K_{ESCRO}$ key to decrypt the security packages 608.

Figure 9:
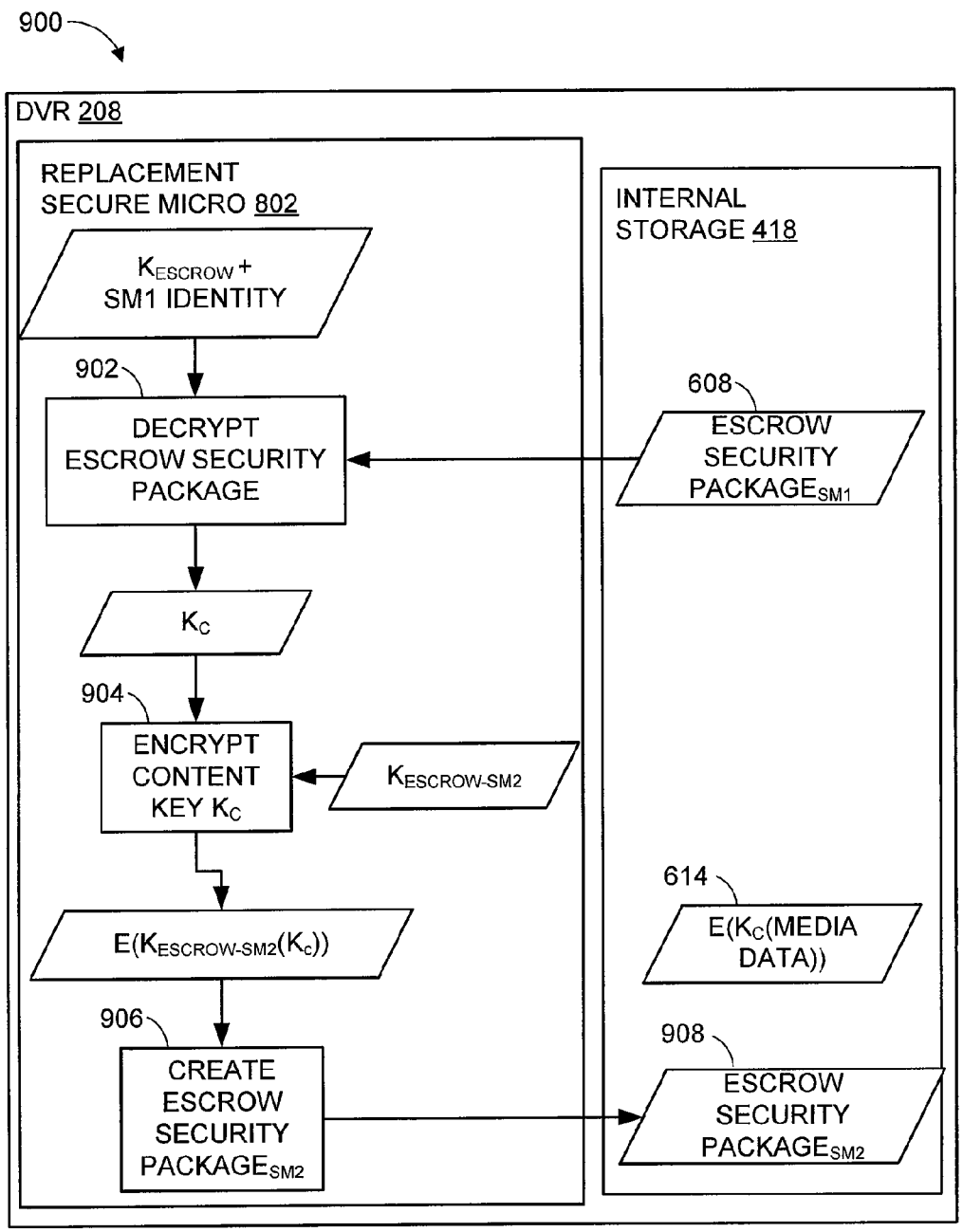
FIG. 9 depicts a data flow diagram representing an embodiment for replacing escrow key security packages created by an original secure microprocessor with corresponding escrow key security packages created by a replacement secure microprocessor.

FIG. 9 depicts a data flow diagram representing an embodiment 900 for replacing escrow key security packages 608 created by the original secure microprocessor 430 with corresponding escrow key security packages created by the replacement secure microprocessor 802. For clarity, the escrow key security packages 608 that are encrypted using the original escrow key of secure microprocessor 430 are depicted in FIG. 9 as escrow key security packages "ESCROW SECURITY PACKAGE$_{SM1}$", while the replacement escrow key security packages 908 are depicted as "ESCROW SECURITY PACKAGE$_{SM2}$".

Specifically, at block 902, the replacement secure microprocessor 802 retrieves the escrow key of the original secure microprocessor along with its associated identity and decrypts escrow security package 608 created by the original secure microprocessor 430 to obtain a content key $K_c$ associated with a desired instance of media content. At block 904, the content key $K_c$ is encrypted (i.e. re-encrypted) with an escrow key generated by the replacement secure microprocessor 802, here designated as $K_{ESCRO-SM2}$ to produce $E(K_{ESCROW-SM2}(K_c))$.

At block 906 a new, replacement escrow security package ESCROW SECURITY PACKAGE$_{SM2}$ 908 is created and stored to internal storage 418. At this time, the escrow security package 608 (i.e. ESCROW SECURITY PACKAGE$_{SM1}$) can be deleted. Accordingly, all of the content keys for all escrow security packages 608 that were created by the original secure microprocessor 430 can be recovered by replacement secure microprocessor 802, and replacement secure microprocessor 802 re-encrypts new security packages with its own escrow key for each of the escrow security packages that were created by the original secure microprocessor 802.

Accordingly, unlike the disclosed escrow key embodiments, according to conventional key recovery techniques, a cable head end recovers a content key for each instance of media content recorded to the remote DVR. In order to access the media content with a replacement secure microprocessor, the replacement secure microprocessor requests the content key for each instance of media content stored to internal storage 418 from the cable head-end. The content key is secured for transmission between the replacement secure microprocessor and the cable head end using asymmetric encryption and decryption. Such an approach requires tremendous bandwidth and, because the encryption is asymmetric, the processing power can be overwhelming. However, using the escrow key approach described herein, the head end (or other key clearinghouse) can delegate the authority to the replacement secure microprocessor to provide access to the content keys associated with encrypted media content on storage devices associated with the replacement secure microprocessor.

Figure 10:
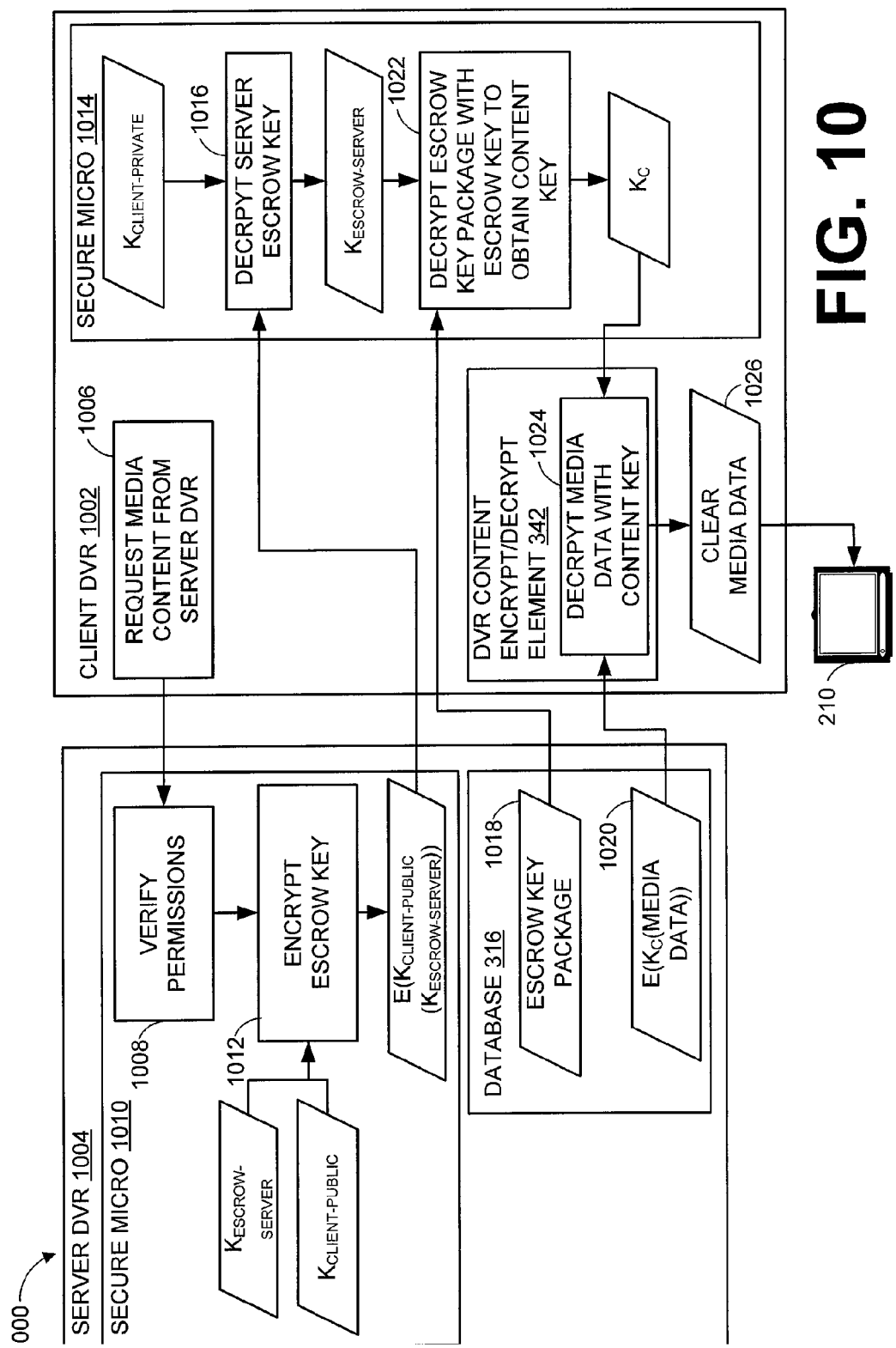
FIG. 10 depicts a data flow diagram representing an embodiment for using an escrow key to facilitate the ability for multiple remote media devices, such as the DVRs of FIG. 2, to share media content.

FIG. 10 depicts a data-flow diagram representing an embodiment 1000 for using an escrow key to facilitate the ability for multiple DVRs to share media content. For example, according to one embodiment, a client DVR 1002 can obtain an escrow key that was used to encrypt content keys used to encrypt instances of media content previously recorded and stored to a device associated with server DVR 1004. Thus, the escrow key can be used by the client DVR 1002 to decrypt one or more content keys used to secure media content to be accessed by the client DVR 1002. The server DVR 1004 and client DVR 1002 can communicate over a communication medium 212 as described with respect to DVR 208 and DVR 208a (FIG. 2). For example, in some embodiments, DVR 1004 and client DVR 1002 may share media content and/or necessary information for obtaining keys to decrypt the media content over the communication medium.

Specifically, at block 1006, client DVR 1002 can request media content from server DVR 1004. At block 1008, the secure microprocessor 1010 of server DVR 1004 receives the request for media content and verifies whether the client DVR 1002 has appropriate permissions to access the requested media content previously encrypted by secure media microprocessor 1010. For example, the client secure microprocessor 1012 can provide proof of its identity to the server secure microprocessor, and the server secure microprocessor 1004 can check a list of trusted devices to confirm that the client secure microprocessor is on the list. One skilled in the art will realize that a number of other approaches for verifying the permission of the client DVR to access the media content associated with server DVR 1004 could be used.

At block 1012, assuming that the client DVR 1002 has permission to access the requested media content, the server secure microprocessor 1010 encrypts the escrow key $K_{ESCROW-SERVER}$ provisioned to secure microprocessor 1010 with the public key $K_{CLIENT-PUBLIC}$ of the client secure microprocessor 1014 to produce encrypted escrow key $E(K_{CLIENT-PUBLIC}(K_{ESCROW-SERVER}))$.

The encrypted escrow key $E(K_{CLIENT-PUBLIC}(K_{ESCROW-SERVER}))$ is then transmitted to client DVR 1002 which, at block 1016, can decrypt the server's escrow key with the private key of the client secure microprocessor 1014 to obtain the escrow key of the server DVR $K_{ESCROW-SERVER}$.

Server DVR 1004 can then send the escrow key package 1018 and the associated encrypted media data 1020 to the client DVR 1002. As described above, among other information, escrow key package 1018 contains an encrypted content key $K_c$ that was previously used to encrypt media data 1020. The encrypted media data 1020 represents, in digital form, the media content requested at block 1006.

At block 1022, the client DVR 1002 can decrypt the escrow key package 1018 associated with the requested media content with the escrow key of the server secure microprocessor 1010 to recover the content key $K_c$. At block 1022, the media data associated with the requested media content can be decrypted with the content key $K_c$ to obtain clear media data 1026. The clear media data may be used, for example, to display media content within television 210.

Accordingly, systems and methods for the secure escrow and recovery of media device content keys has been described that makes use of a two-level symmetric key encryption scheme for DVR recording and playback and which allows a key clearinghouse to delegate individual content key recovery tasks to a replacement secure microprocessor in a user's DVR set top box. Embodiments of the escrow key scheme can also be used for sharing media content between two digital media devices.

According to one embodiment, an initialization process is used to generate a strong symmetric key, called the escrow key, which is associated with a first secure microprocessor. The generated escrow key is encrypted with the public key of the key clearinghouse and an escrow key package is created and stored outside the secure microprocessor, such as on a local hard drive and/or archived at the key clearinghouse.

Additionally, an embodiment of a process for recording and playback of content secured with the escrow key has been described. Upon starting a recording, the first secure microprocessor creates an escrow security package for the media content. The security package can include, among other information, the identity of the secure microprocessor and the encrypted content key. To playback the media content, the security package is delivered to the secure microprocessor, which decrypts the content key with its escrow key and delivers the content key to the device responsible for decrypting the media content from DVR storage.

Further, an embodiment of a content recovery scheme has been described which can be used to play back media content previously encrypted by a first secure microprocessor when the first secure microprocessor is no longer available. An escrow key recovery request is sent to the key clearinghouse and the key clearinghouse confirms whether the replacement secure microprocessor is authorized to decrypt content on behalf of the original secure microprocessor. If the content transfer is authorized, the key clearinghouse decrypts the escrow key package with its private key to recover the escrow key. The head end then re-encrypts the escrow key with the new secure microprocessor public key and sends an escrow key recovery package to the replacement secure microprocessor. The replacement secure microprocessor decrypts the escrow key with its private key, and securely stores the escrow key. Because the new secure microprocessor may be decrypting security packages created by multiple older secure microprocessors, the replacement secure microprocessor stores the identify of the secure microprocessor with its associated escrow key. The replacement secure microprocessor re-encrypts the content keys in all security packages stored to the DVR storage device with its own escrow key. The updated security packages are then stored on the DVR hard drive for later use and the original security packages created by the original secure microprocessor can be deleted.

Any process descriptions, steps, or blocks in the flow or data flow diagrams described herein and/or depicted in the attached figures should be understood as potentially representing modules, segments, or portions of code which include one or more executable instructions for implementing specific logical functions or steps in the process. Alternate implementations are included within the scope of the preferred embodiments of the systems and methods described herein in which steps or functions may be deleted, executed out of order from that shown or discussed, including substantially concurrently or in reverse order, depending on the functionality involved, as would be understood by those reasonably skilled in the art.

Conditional language, such as, among others, "can," "could," "might," or "may," unless specifically stated otherwise, or otherwise understood within the context as used, is generally intended to convey that certain embodiments could include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A method for securing media content comprising:
generating, with a key generator included in a first processor of a first media device, an escrow key for encrypting a plurality of content keys;
encrypting, with the first processor of the first media device, the escrow key with a public key of a key clearinghouse, wherein encrypting the escrow key with the public key of the clearinghouse further comprises appending a current time and an identifier of the first processor with the encrypted escrow key to create an escrow key package;
storing the escrow key package in a storage location outside of the first processor of the first media device;
encrypting the plurality of content keys for encrypting instances of media content with the escrow key;
encrypting an instance of media content to be stored on the memory of a first storage device of the media device with a content key;
storing the content key, encrypted with the escrow key, to the first storage device;
sending, by a second processor, a request to recover the escrow key from the key clearinghouses, the request comprising an identification of the second processor;
receiving from the key clearinghouse an escrow key recovery package comprising the escrow key encrypted with a public key of the of the second processor, wherein receiving from the escrow key recovery package comprises receiving the escrow key recovery package in response to:
  identifying the escrow key package based on the identification of the first processor and the appended current time received with the request to recover the escrow key,
  determining by the key clearinghouse that the second processor is authorized to access the escrow key based on the identification of the second processor,
  decrypting, by the key clearinghouse in response to determination that the second processor is authorized to access the escrow key, the encrypted escrow key with the public key of the key clearing house,
  encrypting, by the key clearinghouse, the decrypted escrow key with the public key of the second processor to create the escrow key recovery package, and
  sending, by the key clearinghouse, the escrow key recovery package to the second processor.

2. The method of claim 1, further comprising:
retrieving the content key, encrypted with the escrow key, from the storage device;
decrypting the content key, encrypted with the escrow key, with the escrow key; and
decrypting the media content with the content key.

3. The method of claim 1, further comprising:
decrypting the escrow key, encrypted with the public key of the second processor, with the private key of the second processor;
decrypting the content key, encrypted with the escrow key, with the escrow key; and
decrypting the instance of media content with the content key.

4. The method of claim 1, wherein the first processor is a secure microprocessor.

5. A non-transitory computer-readable medium on which is stored computer executable instructions which when executed by a first processor, perform a method comprising:
generating an escrow key with a key generator associated with the first processor of the digital media device;
encrypting the escrow key with a public key of a key clearinghouse, wherein encrypting the escrow key with the public key of the clearinghouse further comprises appending a current time and an identity of the first processor with the encrypted escrow key to create an escrow key package;
storing the escrow key package, encrypted with the public key of the key clearinghouse, in a storage location outside of the first processor of the media device;
encrypting a plurality of content keys for encrypting instances of media content with the escrow key;
encrypting an instance of media content to be stored on a first storage device of the media device with a content key;
storing the content key, encrypted with the escrow key, to the first storage device;
sending, by a second processor, a request to recover the escrow key from the key clearinghouses, the request comprising an identification of the second processor;
receiving from the key clearinghouse an escrow key recovery package comprising the escrow key encrypted with a public key of the of the second processor, wherein receiving from the escrow key recovery package comprises receiving the escrow key recovery package in response to:
identifying the escrow key package based on the identification of the first processor and the appended current time received with the request to recover the escrow key,
determining by the key clearinghouse that the second processor is authorized to access the escrow key based on the identification of the second processor,
decrypting, by the key clearinghouse in response to determination that the second processor is authorized to access the escrow key, the encrypted escrow key with the public key of the key clearing house,
encrypting, by the key clearinghouse, the decrypted escrow key with the public key of the second processor to create the escrow key recovery package, and
sending, by the key clearinghouse, the escrow key recovery package to the second processor.

6. The non-transitory computer-readable medium of claim 5, further comprising:
retrieving the content key, encrypted with the escrow key, from the storage device;
decrypting the content key, encrypted with the escrow key, with the escrow key; and
decrypting the media content with the content key.

7. The non-transitory computer-readable medium of claim 6, further comprising:
decrypting the escrow key, encrypted with the public key of the second processor, with the private key of the second processor;
decrypting the content key, encrypted with the escrow key, with the escrow key; and
decrypting the instance of media content with the content key.

8. An access control system for managing encryption keys associated with digital media device comprising:
a first digital media device having a first processor, the first processor configured to:
generate an escrow key for encrypting a plurality of content keys for encrypting instances of media content;
encrypt the escrow key with a public key of a key clearinghouse, wherein the first processor being configured to encrypt the escrow key with the public key of the clearinghouse further comprises the first processor being configured to append a current time and an identity of the first processor with the encrypted escrow key to create an escrow key package;
store the escrow key package, encrypted with the public key of the key clearinghouse, in a storage location outside of the first processor of the media device;
encrypt the plurality of content keys for encrypting instances of media content with the escrow key;
a key clearinghouse for providing conditional access to the escrow key by a second processor, wherein the key clearinghouse is configured to:
receive a request from the second processor to recover the escrow key from the key clearinghouses, the request comprising an identification of the second processor;
identify the escrow key package based on the identification of the first processor and the appended current time received with the request to recover the escrow key;
determine that the second processor is authorized to access the escrow key based on the identification of the second processor,
decrypt, by the key clearinghouse in response to determination that the second processor is authorized to access the escrow key, the encrypted escrow key with a private key of the key clearinghouse,
encrypt the decrypted escrow key with the public key of the second processor,
send the escrow key encrypted with the public key of the second processor to the second processor.

9. The access control system of claim 8, wherein the digital media device is further configured to:
retrieve the content key, encrypted with the escrow key, from the storage device;
decrypt the content key, encrypted with the escrow key, with the escrow key; and
decrypt the media content with the content key.

10. The access control system of claim 8, wherein the second processor is associated with a second media device, the second media device configured to request a release of the escrow key associated with the first processor from the key clearinghouse.

11. The access control system of claim 8, wherein the second processor is further configured to decrypt the escrow key, encrypted with the public key of the second processor, with the private key of the second processor, and decrypt the content key, encrypted with the escrow key, with the escrow key; and
wherein the second media device is configured to decrypt the instance of media content with the content key.

12. The method of claim 1, wherein sending the request by the second processor to recover the escrow key comprises sending the request from the second processor as a replacement for the first processor.

13. The method of claim 1, wherein sending the request by the second processor to recover the escrow key comprises sending the request from the second processor connected to the first processor in a home area network.

14. The method of claim 1, wherein encrypting the escrow key with the public key of the clearinghouse further comprises signing the appended encrypted escrow key with a private key associated with the first processor.

15. The system of claim 8, wherein the second processor is a secure processor.

16. The system of claim 8, wherein the second processor is a replacement of the first processor.

17. The system of claim 8, wherein the second processor is connected to the first processor on a home area network.

* * * * *